(12) United States Patent
Normen

(10) Patent No.: US 6,678,624 B2
(45) Date of Patent: Jan. 13, 2004

(54) APPARATUS, METHODS AND COMPUTER PROGRAM PRODUCTS FOR GENERATING MASS FLOW CALIBRATION FACTORS USING A NORMAL MODAL DYNAMIC CHARACTERIZATION OF A MATERIAL-CONTAINING CONDUIT

(75) Inventor: David F. Normen, Louisville, CO (US)

(73) Assignee: Micro Motion, Inc., Boulder, CO (US)

(*) Notice: Subject to any disclaimer, the term of this patent is extended or adjusted under 35 U.S.C. 154(b) by 0 days.

(21) Appl. No.: 09/941,462

(22) Filed: Aug. 29, 2001

(65) Prior Publication Data
US 2003/0191598 A1 Oct. 9, 2003

(51) Int. Cl.[7] ................................. G01F 1/12
(52) U.S. Cl. ..................... 702/100; 702/45; 702/56
(58) Field of Search ........................... 702/100, 45, 56

(56) References Cited

U.S. PATENT DOCUMENTS

| | | | |
|---|---|---|---|
| 5,050,439 A | | 9/1991 | Thompson |
| 5,323,658 A | | 6/1994 | Yao et al. |
| 5,531,126 A | | 7/1996 | Drahm |
| 5,736,653 A | | 4/1998 | Drahm et al. |
| 5,827,979 A | * | 10/1998 | Schott et al. .......... 73/861.357 |
| 6,233,526 B1 | * | 5/2001 | Cunningham ............... 702/45 |
| 6,249,752 B1 | * | 6/2001 | Cunningham et al. ...... 702/100 |
| 6,272,438 B1 | * | 8/2001 | Cunningham et al. ........ 702/56 |
| 6,301,973 B1 | * | 10/2001 | Smith ...................... 73/861.27 |
| 6,347,293 B1 | * | 2/2002 | Cunningham et al. ...... 702/100 |
| 6,360,175 B1 | * | 3/2002 | Cunningham et al. ........ 702/39 |

OTHER PUBLICATIONS

Stack, C. et al, "A Finite Element for the Vibration Analysis of a Fluid–Conveying Timoshenko Beam", AIAA Paper 93–1552; Apr. 19, 1993; pp. 2120–2129 XP002096659.

* cited by examiner

Primary Examiner—John Barlow
Assistant Examiner—Anthony Dougherty
(74) Attorney, Agent, or Firm—Duft Setter Ollila & Bornsen LLC

(57) ABSTRACT

A calibration factor for a sensor including a material-containing conduit and a plurality of motion transducers operative to generate motion signals representing motion of the conduit is determined from a normal modal dynamic characterization of motion of the conduit. The calibration factor may be generated by generating a solution to a modal differential equation of motion in a modal domain including a plurality of normal modes of motion of the conduit, and by generating the calibration factor from this solution. The normal modal dynamic characterization may characterize motion of the conduit as a function of a modal Coriolis term that describes coupling among a plurality of normal modes of the conduit responsive to mass flow in the conduit. The modal Coriolis term may be determined from a mode shape function that describes modal motion of the conduit as a function of location on the conduit. The invention may be embodied as methods, apparatus and computer program products.

103 Claims, 13 Drawing Sheets

APPARATUS, METHODS AND COMPUTER PROGRAM PRODUCTS FOR GENERATING MASS FLOW CALIBRATION FACTORS USING A NORMAL MODAL DYNAMIC CHARACTERIZATION OF A MATERIAL-CONTAINING CONDUIT

FIELD OF THE INVENTION

The present invention relates to sensors and related methods and computer program products, and more particularly, to mass flow measurement methods, apparatus, computer program products.

BACKGROUND OF THE INVENTION

Coriolis sensors typically operate by detecting motion of a vibrating conduit that contains a flowing material. Properties associated with the material in the conduit, such as mass flow, density and the like, may be determined by processing signals from motion transducers associated with the conduit, as the vibrational modes of the vibrating material-filled system generally are affected by the combined mass, stiffness and damping characteristics of the containing conduit and the material contained therein.

A typical Coriolis mass flowmeter includes one or more conduits that are connected inline in a pipeline or other transport system and convey material, e.g., fluids, slurries and the like, in the system. Each conduit may be viewed as having a set of natural vibrational modes including, for example, simple bending, torsional, radial and coupled modes. In a typical Coriolis mass flow measurement application, a conduit is excited at resonance in one of its natural vibrational modes as a material flows through the conduit, and motion of the conduit is measured at points spaced along the conduit. Excitation is typically provided by an actuator, e.g., an electromechanical device, such as a voice coil-type driver, that perturbs the conduit in a periodic fashion. Mass flow rate may be determined by measuring time or phase differences between motion at the transducer locations. Exemplary Coriolis mass flowmeters are described in U.S. Pat. No. 4,109,524 to Smith, U.S. Pat. No. 4,491,025 to Smith et al., and U.S. Pat. No. Re. 31,450 to Smith.

The accuracy of Coriolis mass flowmeters may be compromised by the mountings which constrain vibration of the conduit. The affects of these constraints may be reduced by using flowmeter designs that are balanced to reduce effects attributable to external vibration, and by using frequency domain filters, e.g., bandpass filters designed to filter out components of the motion signals away from the excitation frequency. However, mechanical filtering approaches are often limited by mechanical considerations, e.g., material limitations, mounting constraints, weight limitations, size limitations and the like, and frequency domain filtering may be ineffective at removing unwanted vibrational contributions near the excitation frequency.

Conventional Coriolis mass flowmeters typically use a "calibration factor" to scale mass flow rate to time difference or phase measurements to generate a mass flow estimate. Typically, in order to generate a calibration factor, a calibration or "proving" procedure is performed in which a material (e.g., water) is passed through the vibrating conduit of the mass flowmeter in a test fixture while signals produced by the motion transducers of the mass flowmeter are processed to determine time or phase differences. This data is then processed to generate an estimated calibration factor for the meter.

This approach can have several disadvantages. The calibration procedure can be time-consuming, labor-intensive and costly. In addition, because the calibration is typically not performed in the field, it may be subject to inaccuracies due to differences between the test conditions and the conditions of the field, including differences in mounting conditions.

SUMMARY OF THE INVENTION

According to embodiments of the present invention, a calibration factor for a parameter sensor including a conduit configured to contain a material and a plurality of motion transducers operative to generate motion signals representing motion of the conduit is determined from a normal modal dynamic characterization of motion of the conduit. The calibration factor may, for example, relate mass flow rate to a spatio-temporal relationship among motion signals produced by the motion transducers, such as a time difference or phase relationship. The calibration factor may be generated, for example, by generating a solution to a modal domain differential equation of motion, and by generating the calibration factor from this solution.

According to some embodiments of the present invention, the normal modal dynamic characterization characterizes motion of the conduit as a function of a modal Coriolis term that describes coupling among a plurality of normal modes of the conduit responsive to mass flow in the conduit. Determination of the calibration factor may be preceded by determining the modal Coriolis term from a mode shape function that describes motion of the conduit in a normal mode as a function of location on the conduit. Modal mass and stiffness terms of the normal modal characterization may be generated using, for example, conventional modal analysis techniques.

For example, in some embodiments, the modal Coriolis term may be determined from a spatial Coriolis characterization that describes motion of a plurality of discrete locations of the conduit in a spatial domain in response to a predetermined mass flow. The modal Coriolis term may be determined from the spatial Coriolis characterization, (e.g., a spatial Coriolis matrix), using a transformation that relates the spatial domain to the plurality of normal modes. The plurality of discrete locations associated with the spatial Coriolis characterization may include locations other than the transducer locations.

The transformation that relates the spatial domain to the plurality of normal modes may be generated from a mode shape function that describes motion of the conduit in a normal mode as a function of location on the conduit. The mode shape function may be determined from a predetermined eigenvalue and a predetermined boundary condition, for example, from an assumption as to a boundary condition to which the conduit will be constrained.

According to other embodiments of the present invention, an orthogonality of a mode shape function for a predetermined mass flow in the conduit is determined in order to determine a modal Coriolis term of a normal modal dynamic characterization of conduit motion. Similar orthogonality determinations can be used to generate modal mass and stiffness terms of the normal modal characterization. Such terms may also be generated using conventional modal analysis techniques.

In other embodiments of the present invention, an estimated spatial response for a plurality of locations of the conduit is generated from a normal modal dynamic characterization, and a calibration factor is generated from the estimated spatial response. For example, a spatio-temporal relationship among movements at a plurality of locations of the conduit, such as a time difference or a phase relationship, may be determined, and the calibration factor may be determined from the spatio-temporal relationship.

In still other embodiments of the present invention, mass flow of a material in a conduit may be determined by determining a calibration factor from a normal modal dynamic characterization of motion of the conduit, generating a plurality of motion signals representing motion of the conduit at a plurality of locations on the conduit, and processing the motion signals according to the determined calibration factor to produce a mass flow estimate. For example, the calibration factor may be determined from a representation of a modal differential equation of motion, as described above. The mass flow estimate may be generated, for example, by determining a spatio-temporal relationship among the plurality of motion signals and applying the calibration factor to the determined spatio-temporal relationship to generate a mass flow estimate.

According to aspects of the present invention, the calibration factor may be determined from a mode shape function that describes motion of the conduit in a normal mode as a function of location on the conduit. The mode shape function may be based on an assumed boundary condition for the conduit. Motion of the conduit may be constrained to induce a boundary condition that approximates the assumed boundary condition, for example, by attaching the conduit to structure or by applying a force to the conduit responsive to motion of the conduit to induce a boundary condition that approximates the assumed boundary condition.

In still other embodiments of the present invention, an apparatus for calibrating a parameter sensor including a conduit configured to contain a material, a plurality of motion transducers operative to generate motion signals representing motion of the conduit and a mass flow estimator circuit operative to estimate mass flow from the motion signals according to a calibration factor is provided. The apparatus includes a calibration factor generator circuit operative to generate a calibration factor from a normal modal dynamic characterization of motion of the conduit, the calibration factor generator circuit including an interface circuit operative to convey the generated calibration factor to the mass flow estimator circuit.

In some embodiments, the calibration factor generator circuit includes a normal modal dynamic characterizer circuit operative to generate a normal modal dynamic characterization of motion of the conduit and a calibration factor determiner circuit operative to determine the calibration factor from the normal modal characterization. The normal modal characterization may be, for example, a representation of a modal differential equation of motion in a modal domain including a plurality of normal modes of motion of the conduit, and the calibration factor determiner circuit may be operative to generate a solution of the modal differential equation of motion from the representation of the modal differential equation of motion and to generate the calibration factor from the solution of the modal differential equation of motion using, for example, the techniques described above. The calibration factor generator circuit may be integrated with the mass flow estimator circuit in, for example, a mass flow sensor apparatus, or may be separately implemented in, for example, test or process control equipment.

In yet other embodiments of the present invention, a mass flow sensor includes a conduit, such as a substantially straight tube, that is configured to contain a material. The mass flow sensor further includes an actuator operative to excite the conduit, a plurality of motion transducers operative to generate motion signals representing motion of the conduit and a mass flow estimator circuit configured to receive the motion signals and operative to generate a mass flow estimate therefrom using a calibration factor derived from a normal modal characterization of motion of the conduit that assumes a predetermined boundary condition for the conduit. Means are provided for constraining motion of the conduit to approximate the predetermined boundary condition.

The means for constraining conduit motion may include, for example, means for attaching the conduit to a structure, such as clamps, welds or other fastening means that attach spaced apart locations of the conduit to a rigid structure. The means for constraining motion of the conduit may also include means for applying a force to the conduit responsive to motion of the conduit to thereby induce a boundary condition that approximates the assumed boundary condition. For example, the means for applying a force to the conduit may include at least two motion transducers operative to generate motion signals representing motion of the conduit, a plurality of actuators operatively associated with the conduit, and a shape control circuit configured to receive motion signals from at least two motion transducers and operative to drive the plurality of actuators responsively thereto.

According to other embodiments of the present invention, a computer program product for characterizing a parameter sensor including a conduit configured to contain a material and a plurality of motion transducers operative to generate motion signals representing motion of the conduit is provided. The computer program product includes computer-readable program code embodied in a computer-readable storage medium, the computer-readable program code including program code for determining a calibration factor for processing motion signals produced by the plurality of motion transducers from a normal modal dynamic characterization of motion of the conduit. The program code for determining a calibration factor may include program code for generating a solution to a modal differential equation of motion in a modal domain including a plurality of normal modes of motion of the conduit, and program code for generating the calibration factor from the generated solution of the modal differential equation of motion. The normal modal dynamic characterization may characterize motion of the conduit as a function of a modal Coriolis term that describes coupling among a plurality of normal modes of the conduit responsive to mass flow in the conduit. The computer readable program code may include program code for determining the modal Coriolis term from a mode shape function that describes motion of the conduit in a normal mode as a function of location on the conduit.

DETAILED DESCRIPTION OF EMBODIMENTS

Figure 1:
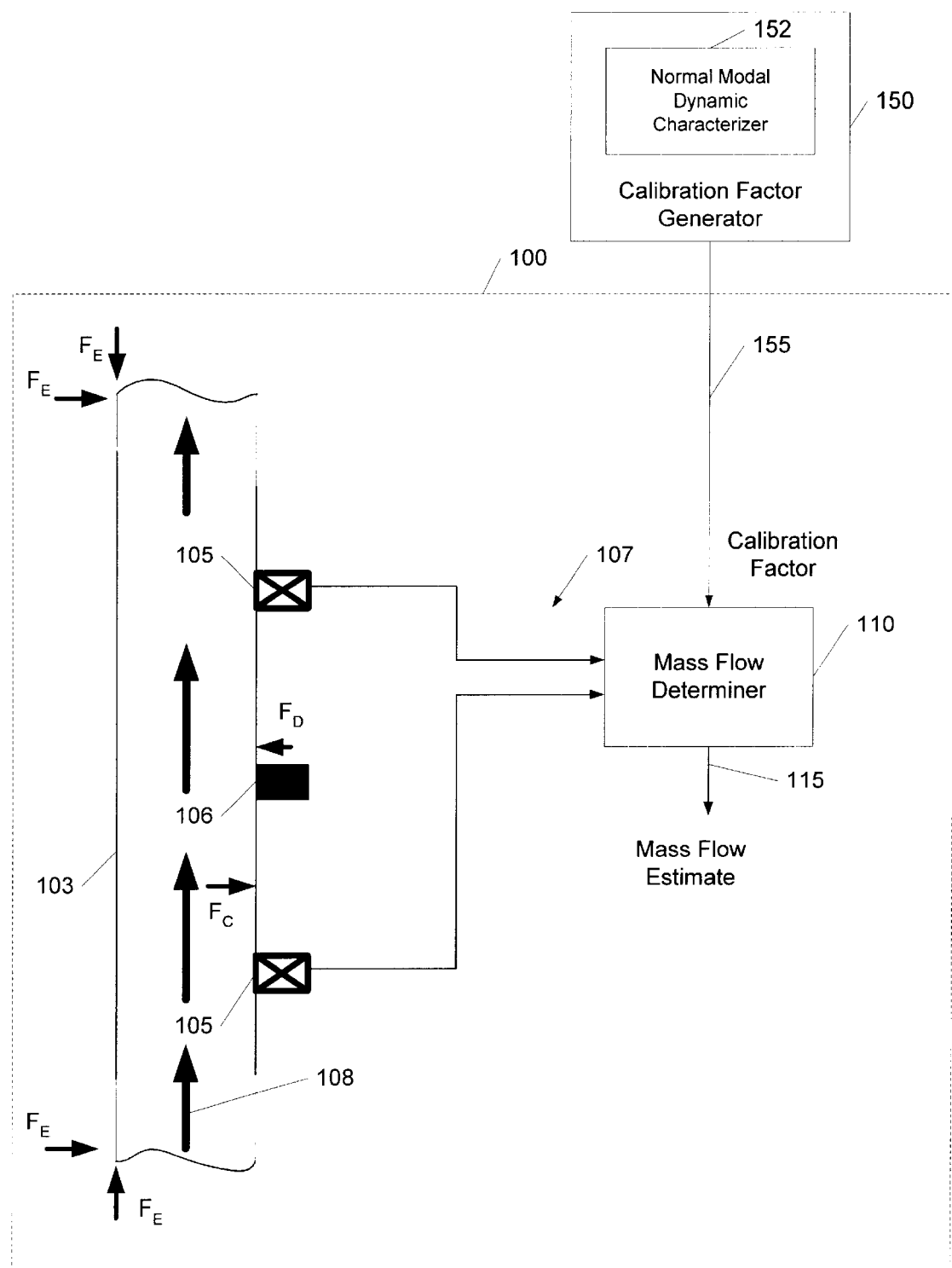
FIG. 1 is a schematic diagram of a mass flow sensor apparatus according to embodiments of the present invention.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as systems (apparatus), methods, or computer program products.

Embodiments of the present invention described herein relate to Coriolis mass flowmeters that utilize a single, substantially straight conduit that does not require, for example, a mechanically-tuned balance beam. The present invention may be particularly advantageous in such applications. However, those skilled in the art will appreciate that the present invention can be used with other types of flowmeter structures, including conventional curved tube structures and straight tube structures including mechanical balance beams.

As will be appreciated by one of skill in the art, the present invention may be embodied as an apparatus and/or method and/or computer program product. The present invention may be implemented in hardware or in a combination of hardware and software aspects. Furthermore, the present invention may also take the form of a computer program product including a computer-usable storage medium having computer-usable program code embodied in the medium. Any suitable computer readable medium may be utilized, including semiconductor memory devices (e.g., RAMs, ROMs, EEPROMs, and the like), hard disks, CD-ROMs, optical storage devices, and magnetic storage devices.

Computer program code for carrying out operations of the present invention may be written in an object oriented programming language, such as Java® or C++, and/or in a procedural programming languages, such as "C." The program code may execute on a single computer or data processing device, such as a microcontroller, microprocessor, or digital signal processor (DSP), or may be executed on multiple devices, for example, on multiple data processing devices that communicate via serial or parallel data busses within an electronic circuit board, chassis or assembly, or which form part of a data communications network such as a local area network (LAN), wide area network (WAN), or internet.

The present invention is described below with reference to flowchart illustrations and/or block diagrams of methods, apparatus (systems) and computer program products according to embodiments of the invention. It will be understood that blocks of the flowchart illustrations and/or block diagrams, and combinations of blocks in the flowchart illustrations and/or block diagrams, can be implemented by computer program code (instructions). These computer program code may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks. These computer program products also may be embodied in a computer-readable storage medium (e.g., magnetic disk or semiconductor memory, code magnetic memory or the like) that can direct a computer or other programmable data processing apparatus to function in a particular manner, such that the computer program stored in the computer-readable memory produce an article of manufacture including instruction means which implement the function specified in the flowchart and/or block diagram block or blocks. The computer program code may also be loaded onto a computer or other programmable data processing apparatus to cause a series of operational steps to be performed on the computer or other programmable apparatus to produce a computer implemented process such that the code that executes on the computer or other programmable apparatus provides steps for implementing the functions specified in the flowchart and/or block diagram block or blocks.

Overview

According to embodiments of the present invention, a Coriolis mass flow sensor may be calibrated using a normal modal dynamic characterization of the motion of the sensor's material-containing conduit. In some embodiments of the present invention, this normal modal dynamic characterization comprises a modal differential equation of motion that includes a Coriolis term that represents coupling among normal modes of the flow sensor conduit in response to mass flow.

According to some embodiments of the present invention, the Coriolis term comprises a modal Coriolis matrix that is generated from a spatial (or "physical") Coriolis matrix that describes mass flow dependent motion of the conduit in a spatial domain (e.g., Cartesion). The modal Coriolis matrix may be derived from the spatial Coriolis matrix using a transformation that is derived from a mode shape function that describes modal behavior of the conduit as a function of location on the conduit. The mode shape function may be generated from motion signals generated by motion transducers operatively associated with the sensor conduit. In particular, discrete modal response data from the transducer locations may be used to generate a continuous mode shape function, which may then be used to calculate a modal-to-spatial transformation $\Phi_{virtual}$ that includes "virtual" locations of the conduit other than the actual transducer locations, such as locations between the actual transducer locations.

The spatial Coriolis matrix may represent a combination of local Coriolis matrices that correspond to beamlike segments defined by nodes corresponding to the virtual locations. The local Coriolis matrices represent motion of these segments under a predetermined mass flow condition, (e.g., a predetermined mass flow rate). The transformation $\Phi_{virtual}$ may be applied to the spatial Coriolis matrix to determine a modal Coriolis term (matrix) of a (vector) modal differential equation of motion that also includes modal mass, modal damping and modal stiffness terms.

The modal differential equation of motion may be solved to determine a modal response at the predetermined mass flow rate from a known input/excitation. The modal response may be converted to a spatial domain response at the actual transducer locations, and a calibration factor may then be determined based on the estimated spatial domain response and the predetermined mass flow rate. This calibration factor may then be applied to motion signals generated in response to an unknown mass flow to generate an estimate of the unknown mass flow.

According to other embodiments of the present invention, a more generalized approach to determining a modal Coriolis matrix may be taken. In particular, instead of determining a modal Coriolis matrix from a discrete transformation of a spatial Coriolis matrix, a modal Coriolis matrix may be generated by determining an orthogonality of a mode shape function at a predetermined mass flow rate. A modal Coriolis matrix so determined may be then used to generate a solution to a modal differential equation of motion for the conduit and, from this, a calibration factor may be determined along the lines described above.

Embodiments of the present invention offer several potential advantages over conventional calibration techniques. In particular, use of calibration techniques according to embodiments of the present invention may eliminate a need to pass material through the mass flow sensor, as is commonly required in conventional proving processes. This can provide, for example, an in situ calibration capability.

The present invention can also facilitate the practical implementation of straight tube mass flow sensors such as "clamp-on" mass flow sensors, e.g., sensors that include motion transducers, actuators and related components that are configured to operatively engage to a pipeline such that the pipeline itself serves as part of the sensor. A potential difficulty in calibrating such a clamp on sensor is that, unlike a conventional Coriolis mass flow meter, the flow conduit may not be available to the sensor's manufacturer. Although one theoretically could connect a prover to the pipeline and calibrate a clamp-on flow sensor against a master meter, such a procedure may be prohibitively time consuming, costly, or impractical due to difficulty in accessing the sensor, harshness of the pipeline environment, and the like. According to embodiments of the present invention, in situ calibration of such a sensor can be performed by measuring the modal parameters of the installation after the sensor components are installed. This can eliminate the need for a calibration facility or master meter.

A potential advantage of such a clamp-on flow sensor is that it may be moved to different locations and used, for example, as a temporary sensor for trouble shooting purposes. As each pipeline the sensor components are attached to may differ, a calibration may be needed each time the sensor is relocated. In situ calibration according to embodiments of the invention can provide a practical and cost-effective way to perform such a calibration.

FIG. 1 illustrates a mass flow sensor apparatus 100 according to embodiments of the present invention. The sensor 100 includes a conduit 103 configured to contain a material 108. An actuator 106 is operative to excite the conduit 103. For example, the actuator 106 may comprise an inertial or relative actuator driven by a drive circuit (not shown) that causes the actuator 106 to vibrate the conduit 103 at a predetermined frequency; however, it will be appreciated that other mechanisms for imparting vibratory motion to the conduit 103 may be used. Motion transducers 105 (e.g., inertial velocity transducers, accelerometers or other motion-sensing devices) are positioned along the conduit 103 and produce motion signals 107 representing motion of the conduit 103 in response to a plurality of forces that may include, for example, a drive force $F_D$ imparted by the actuator 106, Coriolis forces Fc arising from the flowing material 108, and extraneous forces $F_E$.

The sensor interface circuit 100 further includes a mass flow determiner circuit 110 that is operative to receive the motion signals 107 and to generate a mass flow estimate 115 therefrom according to a calibration factor 155. The calibration factor generator circuit 150 determines the calibration factor 155 from a normal modal dynamic characterizer 152, which characterizes the normal mode dynamics of the conduit 103, for example, a modal differential equation of motion as described in detail below. As also described in detail below, the normal modal dynamic characterization may be derived from a mode shape function generated from discrete modal response data, e.g., response data generated by motion signals representing motion of the conduit, such as motion signals generated by the motion transducers 105.

Figure 2:
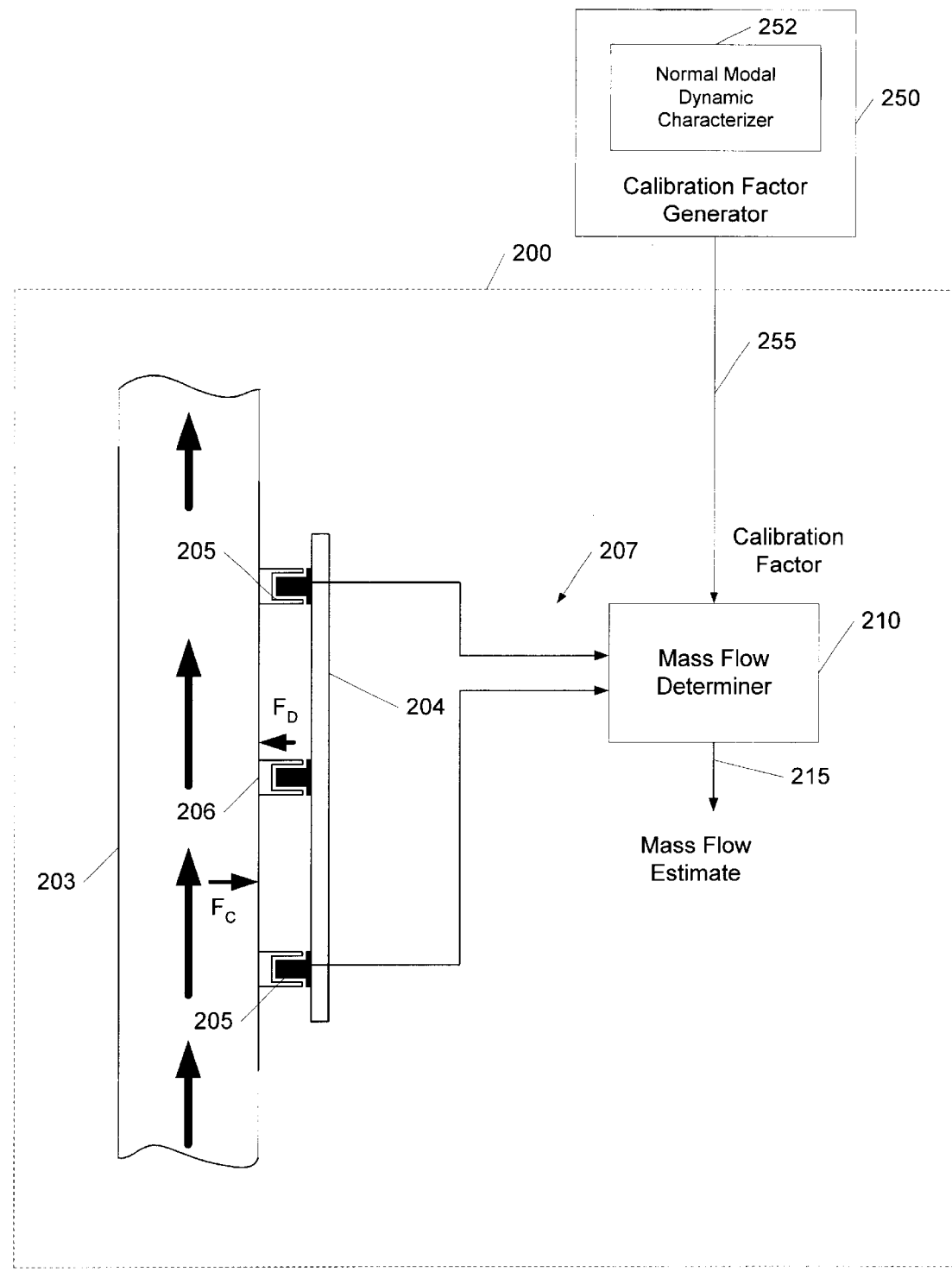
FIG. 2 is a schematic diagram of a mass flow sensor apparatus according to other embodiments of the present invention.

FIG. 2 illustrates a mass flow sensor apparatus 200 according to other embodiments of the present invention. The sensor 200 includes a conduit 203 configured to contain a material 208. A relative actuator 206 is attached to a structure 204 (which may comprise, for example, a housing that encloses the conduit 203) such that it induces motion of the conduit 203 relative to the structure 204. As shown, relative motion transducers 205 (e.g., velocity transducers, accelerometers or other motion-sensing devices) are positioned along the conduit 203 and measure motion of the conduit 203 relative to the structure 204. The motion transducers 205 produce motion signals 207 representing motion of the conduit 203 in response to forces exerted on the conduit 203. It will be understood that, although the motion transducers 205 are shown as relative motion transducers, absolute or "inertial" motion sensors (e.g., accelerometers), or a combination of relative and absolute motion transducers (e.g., a combination of relative velocity transducers and accelerometers), may be used instead.

The sensor 200 further includes a mass flow determiner circuit 210 that is operative to receive the motion signals 207 and to generate a mass flow estimate 215 therefrom according to a calibration factor 255. The calibration factor generator circuit 250 determines the calibration factor 255 from a normal modal dynamic characterizer 252, which characterizes the normal mode dynamics of the conduit 103.

It will be understood that, in general, functions of a calibration factor generator circuit according to embodiments of the present invention, such as the calibration factor generator circuits 150, 250 of FIGS. 1 and 2, may be implemented in analog circuitry, digital circuitry and combinations thereof. This circuitry may be integrated in a single device, such as a microprocessor, microcontroller, digital signal processor (DSP), application-specific integrated circuit or other monolithic device, or may be distributed across multiple devices. It will be further appreciated that a calibration factor generator circuit according to embodiments of the present invention may be integrated within a flow sensor apparatus, e.g., using processing circuitry also used to implement a mass flow determiner circuit such as the mass flow determiner circuits 110, 210 of FIG. 1, or may implemented in separate hardware, such as a piece of test or maintenance equipment or process control computing apparatus. For example, a calibration factor generator circuit could be implemented in test equipment designed to interface with motion transducers of a flow sensor, to determine a calibration factor from motion signals generated by the motion transducers, and to download the determined calibration factor to a mass flow determiner circuit of the flow sensor.

The following discussion provides an underlying theoretical description that supports apparatus, methods and computer program products according to embodiments of the present invention. It will be appreciated that the scope of the present invention is not limited to this theoretical explanation. For example, the discussion that follows describes computational operations. Although these operations are presented with a particular sequence and organization to facilitate understanding of the present invention, it will be appreciated that the computational operations may be reordered, combined in a different fashion or otherwise modified within the scope of the present invention. Consequently, it will be further understood that, in general, the present invention includes not only the specific computational operations described herein, but also equivalent operations.

A modal differential equation of motion for a single straight flowmeter conduit, such as the conduit 103 of FIG. 1, is:

$$[mr]\{\ddot{\eta}\}+[cr]\{\dot{\eta}\}+[dr]\{\dot{\eta}\}+[kr]\{\eta\}=\{N\}, \quad (1)$$

where $\{\eta\}$, $\{\dot{\eta}\}$, $\{\ddot{\eta}\}$ represent displacement, velocity and acceleration vectors, respectively, in a normal modal domain comprising a plurality of normal (i.e., orthogonal) modes of vibration of the conduit, [mr] is a modal mass matrix, [cr] is a modal Coriolis matrix that describes coupling between the normal modes of the conduit responsive to mass flow in the conduit, [dr] is a modal damping matrix, [kr] is a modal stiffness matrix, and $\{N\}$ is a modal excitation applied to the conduit. The modal mass matrix [mr] and the modal stiffness matrix [kr] may be determined using conventional modal analysis techniques. However, determining the modal Coriolis matrix [cr] can be problematic. As described in greater detail below, a flow calibration factor (FCF) may be assumed to be relatively insensitive to damping and strongly correlated to the modal Coriolis matrix [cr].

A U.S. patent application Ser. No. 09/941,332, entitled "DETERMINING PROPERTIES OF A FLOW TUBE AND OF A FLUID FLOWING THROUGH A FLOW TUBE OF A CORIOLIS FLOWMETER," filed concurrently herewith and incorporated herein by reference in its entirety, describes how discrete mode shape information for a flowmeter conduit gained from motion transducers that generate motion signals representative of motion of the flowmeter conduit can be used to determine a continuous mode shape function, i.e., a function that describes motion of the conduit in a plurality of normal modes as a function of location on the conduit. From such a continuous mode shape function, "virtual" pickoff responses, i.e., responses for locations other than the transducer locations, may be synthesized.

The aforementioned patent application Ser. No. 09/941,332 describes continuous mode shape functions of the form:

$$\Phi_r(x) = [\, e^{\lambda 1_r x} \quad e^{-\lambda 1_r x} \quad e^{j\lambda 2_r x} \quad e^{-j\lambda 2_r x}\,]\begin{Bmatrix} bc_1 \\ bc_2 \\ bc_3 \\ bc_4 \end{Bmatrix}_r, \quad (2)$$

wherein $\Phi_r$ is a mode shape function for an r-th normal mode, and wherein eigenvalues $\lambda 1_r, \lambda 2_r$ and boundary conditions $\{bc_1, bc_2, bc_3, bc_4\}_r$ of the mode shape function $\Phi_r$ may be calculated from modal measurements.

Such a mode shape function can be used to transform a spatial or "physical" Coriolis matrix to a modal Coriolis matrix. In particular, a modal transformation $[\Phi_{virtual}]$ for a plurality of selected locations of a flowmeter conduit may be synthesized using mode shape functions as described above. The number of such "virtual" locations preferably is greater than the number of locations at which motion transducers are present. A modal Coriolis matrix [cr] may then be calculated from a spatial Coriolis matrix [C] for the plurality of virtual locations using $[\Phi_{virtual}]$ according to the following:

$$[cr]=[\Phi_{virtual}]^T[C][\Phi_{virtual}] \quad (3)$$

The spatial Coriolis matrix [C] may be generated using conventional techniques. The plurality of virtual locations of the conduit may be viewed as defining a plurality of beam-like segments having first and second nodes that correspond to virtual locations, with a spatial Coriolis matrix for each segment at a predetermined mass flow rate $\dot{m}$ being given by:

$$[C_{local}] = \quad (4)$$

$$\dot{m}\begin{bmatrix} 0 & \dfrac{10gzl+l^2}{60gz+5l^2} & 1 & -\dfrac{10gzl+l^2}{60gz+5l^2} \\ -\dfrac{10gzl+l^2}{60gz+5l^2} & 0 & \dfrac{10gzl+l^2}{60gz+5l^2} & -\dfrac{l^4}{360gz+30l^2} \\ -1 & -\dfrac{10gzl+l^2}{60gz+5L^2} & 0 & \dfrac{10gzl+l^2}{60gz+5l^2} \\ \dfrac{10gzl+l^2}{60gz+5l^2} & \dfrac{l^4}{360gz+30l^2} & -\dfrac{10gzl+l^2}{60gz+5l^2} & 0 \end{bmatrix}$$

wherein the first row/column of the "local" Coriolis matrix $[C_{local}]$ corresponds to the physical displacement of a first node of a segment, the second row and column corresponds to the angular displacement of the first node of the segment, the third row/column corresponds to the physical displacement of a second node of the segment, and the forth row and column corresponds to the angular displacement of the second node of the segment. In equation (4), l is the length of the segment and gz represents a combination material and geometric properties of the conduit, which may be given by:

$$gz = \frac{EI_t}{\hat{k}GA_t} \quad (5)$$

wherein E is the modulus of elasticity for the conduit material, $I_t$ is the area moment of inertia for the conduit, G is the shear modulus of elasticity for the conduit material, $A_t$ is the cross-sectional area of the conduit, $\hat{k}$ is a numerical factor dependent on the cross-sectional shape of the conduit. The spatial Coriolis matrix [C] for the conduit may be constructed from the local Coriolis matrices $[C_{local}]$, using techniques known to those skilled in the art.

A modal dynamic stiffness matrix [MDS] for a drive frequency excitation, i.e., a frequency at which the conduit is vibrated, can then be created and inverted to determine a modal frequency response function $[MDS]^{-1}$ that can be used to determine a modal response $\{\eta\}$ for the predetermined mass flow rate $\dot{m}$:

$$\{\eta\}=(-\omega_{drv}^2[mr]+j\omega_{drv}[cr]+j\omega_{drv}[dr]+[kr])^{-1}\{N\}=[MDS]^{-1}\{N\}. \quad (6)$$

The modal response $\{\eta\}$ can be transformed into a spatial domain response vector $\{y\}$ as follows:

$$\{y\}=[\Phi_{measured}][MDS]^{-1}[\Phi_{measured}]^T\{F\}. \quad (7)$$

A spatio-temporal relationship between transducer locations, such as a time difference ("delta-t") or a phase relationship between motion signals corresponding to the transducer locations, for the predetermined mass flow rate $\dot{m}$ can be determined from the estimated spatial response $\{y\}$. For example, a spatial integration technique for generating a time difference or phase estimate from spatial motion information provided by a plurality of spatially distributed motion transducers may be used. An example of a spatial integration technique is described in U.S. patent application Ser. No. 09/116,845 to Cunningham et al., filed Jul. 16, 1998 and incorporated herein by reference in its entirety [previously filed case on spatial integration].

The time difference or phase relationship, which may be referred to generally as $\Delta$, and the predetermined mass flow rate $\dot{m}$ can be used to determine a flow calibration factor FCF in the appropriate units (e.g., mass/sec/sec or mass/sec/degrees):

$$FCF = \frac{\dot{m}}{\Delta}. \quad (8)$$

A time difference or phase relationship measurement (generally, $\Delta_{measured}$) generated responsive to an unknown mass flow rate $\dot{m}_{unknown}$ may be multiplied by the calibration factor FCF to generate an estimate of the unknown mass flow rate $\dot{m}_{unknown}$:

$$\dot{m}_{unknown}=FCF\times(\Delta_{measured}-\Delta_0), \quad (9)$$

where $\Delta_0$ is an offset (e.g., time or phase) between transducer signals at substantially zero flow ("zero offset").

Experimentation indicates that, in many practical applications, mass flow rate is nearly linearly proportional to time-difference over a range of mass flow rates, such that FCF may be assumed to be constant. However, if FCF is not sufficiently constant with flow, it could be estimated over a range of assumed flow rates to develop, for example, a lookup table or functional representation thereof. FCF could also be modified based on other parameters, such as temperature, e.g., one could compensate for a change in FCF due to changes in modulus (E) with temperature.

If it is assumed that the ends of a flow conduit of a mass flow sensor are constrained such that forced response of the motion of the conduit ends is about zero, and if it is further assumed that the case or other structure supporting the motion transducers is stiff and massive enough such that it acts like a rigid body, the motion signals generated by the sensor's motion transducers can be treated as approximating absolute velocity signals. Under such conditions, the flow conduit can be treated as having approximately fixed boundary conditions at the frequency of excitation of the conduit. The boundary conditions and eigenvalues may, therefore, be determined, at least for Euler beam assumptions.

Figure 13:
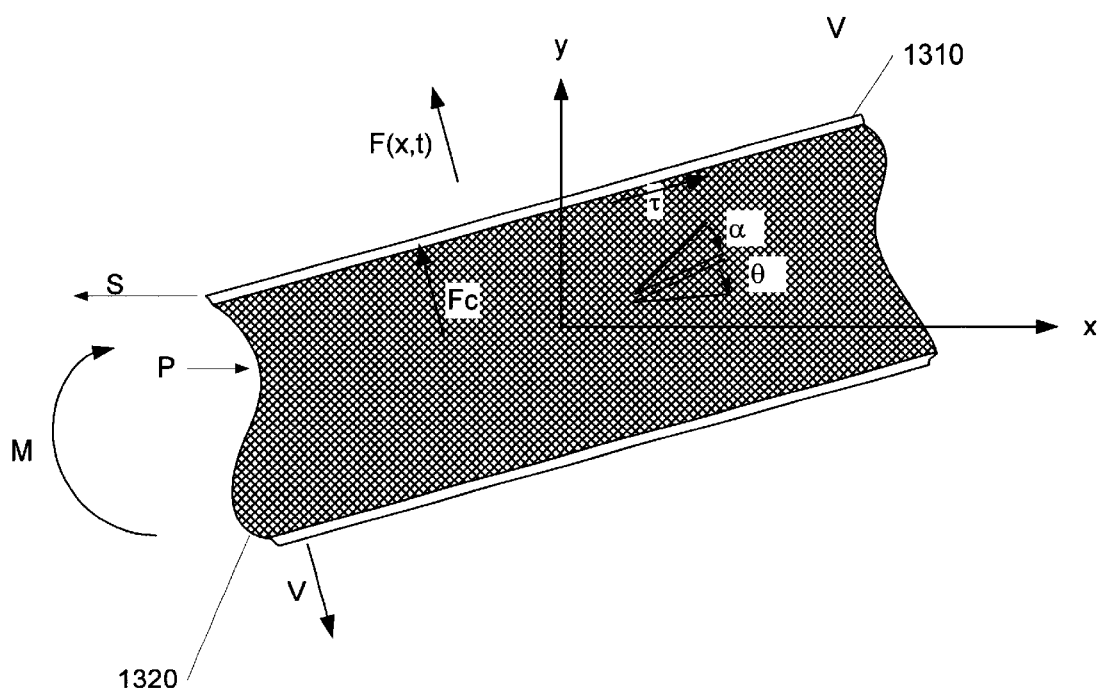
FIG. 13 is a free-body diagram illustrating behavior of a material-containing conduit.

For a flow sensor conduit 1310 as illustrated in the free-body diagram of FIG. 13:

$$V'-\rho_t A_t-d\ddot{y}+Fc+\tau\bar{c}(\theta+\alpha)+F(x,t)=0$$

$$M'-Sy'+V-\rho_t I_t-Mc=0 \quad (10)$$

where V is the shear force exerted on the conduit 1310, $\rho_t$ is the density of the material of the conduit 1310, $A_t$ is the cross-sectional area of the conduit 1310, d is a damping coefficient, $\ddot{y}$ is the acceleration of the conduit 1310, Fc is force coupling between a material 1320 contained in the conduit 1310, $\tau$ is viscous shear force between the material 1320 in the conduit and the inner wall of the conduit 1310, $\theta$ is the angular displacement of the conduit 1310, $\alpha$ is the shear distortion of the conduit 1310, F(x,t) is the drive force applied to the conduit 1310, M is the bending moment of the conduit 1310, S is the tension acting on the conduit 1310, $\rho_t I_t$ is the inertia per unit length of the conduit 1310, and $\bar{c}$ is circumference of the inner surface of the conduit 1310, and wherein dots indicate time derivatives and primes indicate spatial derivatives with respect to length. For the material 1320 contained within the conduit 1310:

$$-\rho_f A_f\left(\frac{\partial}{\partial t}+v_f\frac{\partial}{\partial x}\right)^2 y - Fc - \tau\bar{c}(\theta+\alpha) = 00 \quad (11)$$

$$-\rho_f I_f\ddot{\theta} + Mc + PA_f y' = 0$$

where $\rho_f A_f$ is the mass per unit length of the material 1320 in the conduit 1310, y is the displacement of the conduit 1310, $v_f$ is the velocity of the material 1320 in the conduit 1310, $\rho_f I_f$ is the inertia per unit length of the material 1320 in the conduit 1310, $\theta$ is the angular acceleration of the conduit 1310, P is the pressure of the material 1320 in the conduit 1310, and $A_f$ is the cross-sectional area of the material 1320 in the conduit 1310.

Eliminating coupling forces (Fc), moments (Mc) and fluid shear ( ) on the wall of the conduit "beam":

$$V' - \rho_t A_t - d\ddot{y} + \rho_f A_f\left(\frac{\partial}{\partial t}+v_f\frac{\partial}{\partial x}\right)^2 y + F(x,t) = 0 \quad (12)$$

$$M' - Sy' + V - (\rho_t I_t + \rho_f I_f)\ddot{\theta} + PA_f y' = 0$$

From basic elasticity principles:

$$y'(x,t)=\theta(x,t)+\alpha(x,t) V(x,t)=\hat{k}GA\alpha(x,t) M(x,t)=EI_t\theta'(x,t) \quad (13)$$

This can be reduced to two equations in terms of y(x,t) and x,t.

$$\hat{k}GA_t(y''-\theta')-\rho_t A_t\ddot{y}-d\dot{y}-\rho_f A_f\left(\frac{\partial}{\partial t}+v_f\frac{\partial}{\partial x}\right)^2 y + f(x,t) = 0 \quad (14)$$

$$EI_t\theta''-Sy'+\hat{k}GA_t(y'-\theta)-(\rho_t I_t+\rho_f I_f)\ddot{\theta}+PA_f y'=0$$

Non-dimensionalizing the basic independent variables in equation (14), where the under-bar indicates a dimensionless variable of space or time and the pointed brackets indicate the U.S. Customary units for the variables:

$$x = L\underline{x} \quad dx = Ld\underline{x} \tag{15}$$

$$t = \frac{1}{\omega_1}\underline{t} \quad dt = \frac{1}{\omega_1}d\underline{t} \quad \underline{\omega}_r = \frac{\omega_r}{\omega_1} \quad \underline{\omega} = \frac{\omega}{\omega_1}$$

$$\eta_r(t) = e^{j\omega t} = \eta_r(\underline{t}) = e^{j\frac{\omega}{\omega_1}\underline{t}} = e^{j\underline{\omega}\underline{t}} \langle in \rangle \quad \underline{\eta}_r(\underline{t}) = \frac{1}{L}\eta_r(t)\langle 0 \rangle$$

$$\Phi_r(x) = \Phi_r(\underline{x}) = \underline{\Phi}_r(\underline{x})\langle 0 \rangle$$

$$\Phi_r(x) = [\,e^{\lambda 1,x} \quad e^{-\lambda 1,x} \quad e^{j\lambda 2,x} \quad e^{-j\lambda 2,x}\,]\{BC_r\}\langle 0 \rangle$$

$$\Phi_r(\underline{x}) = [\,e^{\lambda 1,L\underline{x}} \quad e^{-\lambda 1,L\underline{x}} \quad e^{j\lambda 2,L\underline{x}} \quad e^{-j\lambda 2,L\underline{x}}\,]\{BC_r\}\langle 0 \rangle$$

$$\underline{\Phi}_r(\underline{x}) = [\,e^{\lambda 1,L\underline{x}} \quad e^{-\lambda 1,L\underline{x}} \quad e^{j\lambda 2,L\underline{x}} \quad e^{-j\lambda 2,L\underline{x}}\,]\{BC_r\}\langle 0 \rangle$$

$$\Psi_r(x) = \Psi_r(\underline{x}) = \frac{1}{L}\underline{\Psi}_r(\underline{x})\langle 1/in \rangle$$

$$\Psi_r(x) = [\,e^{\lambda 1,x} \quad e^{-\lambda 1,x} \quad e^{j\lambda 2,x} \quad e^{-j\lambda 2,x}\,][u_r]\{BC_r\}\langle 1/in \rangle$$

$$\Psi_r(\underline{x}) = [\,e^{\lambda 1,L\underline{x}} \quad e^{-\lambda 1,L\underline{x}} \quad e^{j\lambda 2,L\underline{x}} \quad e^{-j\lambda 2,L\underline{x}}\,][u_r]\{BC_r\}\langle 1/in \rangle$$

$$\underline{\Psi}_r(\underline{x}) = [\,e^{\lambda 1,L\underline{x}} \quad e^{-\lambda 1,L\underline{x}} \quad e^{j\lambda 2,L\underline{x}} \quad e^{-j\lambda 2,L\underline{x}}\,][\underline{u}_r]\{BC_r\}\langle 0 \rangle$$

$$[\underline{u}_r] = L[u_r]$$

$$y(x,t) = \sum_r \Phi_r(x)\eta_r(t) = \sum_r \Phi_r(\underline{x})\eta_r(\underline{t}) = y(\underline{x},\underline{t}) = \langle in \rangle$$

$$\underline{y}(\underline{x},\underline{t}) = \frac{1}{L}\sum_r \Phi_r(\underline{x})\eta_r(\underline{t}) = \sum_r \underline{\Phi}_r(\underline{x})\underline{\eta}_r(\underline{t})\langle 0 \rangle$$

$$\theta(x,t) = \sum_r \Psi_r(x)\eta_r(t) = \sum_r \Psi_r(\underline{x})\eta_r(\underline{t}) = \theta(\underline{x},\underline{t}) = \langle 0 \rangle$$

$$\underline{\theta}(\underline{x},\underline{t}) = \sum_r \frac{1}{L}\sum_r \underline{\Psi}_r(\underline{x})L\underline{\eta}_r(\underline{t}) = \sum_r \underline{\Psi}_r(\underline{x})\underline{\eta}_r(\underline{t})\langle 0 \rangle$$

Differentiating and integrating for the non-dimensionalized mode shapes $\Phi_r, \Psi_r$:

$$\frac{\partial y(x,t)}{\partial x} = \frac{1}{L}\frac{\partial \Phi_r(\underline{x})}{\partial \underline{x}}\eta_r(\underline{t}) = \frac{\partial \underline{\Phi}_r(\underline{x})}{\partial \underline{x}}\underline{\eta}_r(\underline{t})\langle 0 \rangle \tag{16}$$

$$\frac{\partial^2 y(x,t)}{\partial x^2} = \frac{1}{L^2}\frac{\partial^2 \Phi_r(\underline{x})}{\partial \underline{x}^2}\eta_r(\underline{t}) = \frac{1}{L}\frac{\partial^2 \underline{\Phi}_r(\underline{x})}{\partial \underline{x}^2}\underline{\eta}_r(\underline{t})\left\langle \frac{1}{in}\right\rangle$$

$$\frac{\partial y(x,t)}{\partial t} = \omega_1 \Phi_r(\underline{x})\frac{\partial \eta_r(\underline{t})}{\partial \underline{t}} = \omega_1 L\underline{\Phi}_r(\underline{x})\frac{\partial \underline{\eta}_r(\underline{t})}{\partial \underline{t}}\left\langle \frac{in}{\sec}\right\rangle$$

$$\frac{\partial^2 y(x,t)}{\partial t^2} = \omega_1^2 \Phi_r(\underline{x})\frac{\partial^2 \eta_r(\underline{t})}{\partial \underline{t}^2} = \omega_1^2 L\underline{\Phi}_r(\underline{x})\frac{\partial \underline{\eta}_r(\underline{t})}{\partial \underline{t}}\left\langle \frac{in}{\sec^2}\right\rangle$$

$$\frac{\partial^2 y(x,t)}{\partial x \partial t} = \frac{\omega_1}{L}\frac{\partial \Phi_r(\underline{x})}{\partial \underline{x}}\frac{\partial \eta_r(\underline{t})}{\partial \underline{t}} = \omega_1 \frac{\partial \underline{\Phi}_r(\underline{x})}{\partial \underline{x}}\frac{\partial \underline{\eta}_r(\underline{t})}{\partial \underline{t}}\left\langle \frac{1}{\sec}\right\rangle$$

$$\frac{\partial \theta(x,t)}{\partial x} = \frac{1}{L}\frac{\partial \Psi_r(\underline{x})}{\partial \underline{x}}\eta_r(\underline{t}) = \frac{1}{L}\frac{\partial \underline{\Psi}_r(\underline{x})}{\partial \underline{x}}\underline{\eta}_r(\underline{t})\left\langle \frac{1}{in}\right\rangle$$

$$\frac{\partial^2 \theta(x,t)}{\partial x^2} = \frac{1}{L^2}\frac{\partial^2 \Psi_r(\underline{x})}{\partial \underline{x}^2}\eta_r(\underline{t}) = \frac{1}{L^2}\frac{\partial^2 \underline{\Psi}_r(\underline{x})}{\partial \underline{x}^2}\underline{\eta}_r(\underline{t})\left\langle \frac{1}{in^2}\right\rangle$$

$$\frac{\partial \theta(x,t)}{\partial t} = \omega_1 \Psi_r(\underline{x})\frac{\partial \eta_r(\underline{t})}{\partial \underline{t}} = \omega_1 \underline{\Psi}_r(\underline{x})\frac{\partial \underline{\eta}_r(\underline{t})}{\partial \underline{t}}\left\langle \frac{1}{\sec}\right\rangle$$

$$\frac{\partial^2 \theta(x,t)}{\partial t^2} = \omega_1^2 \Psi_r(\underline{x})\frac{\partial^2 \eta_r(\underline{t})}{\partial \underline{t}^2} = \omega_1^2 \underline{\Psi}_r(\underline{x})\frac{\partial \underline{\eta}_r(\underline{t})}{\partial \underline{t}} = \frac{\partial \underline{\eta}_r(\underline{t})}{\partial \underline{t}}\left\langle \frac{1}{\sec}\right\rangle$$

$$\frac{\partial \Phi_r(x)}{\partial x} = \frac{1}{L}\frac{\partial \Phi_r(\underline{x})}{\partial \underline{x}} = \langle 1/in \rangle$$

$$\frac{\partial \Psi_r(x)}{\partial x} = \frac{1}{L}\frac{\partial \Psi_r(\underline{x})}{\partial \underline{x}} = \langle 1/in^2 \rangle$$

$$\int_{x_L}^{x_R}\Phi_r(x)dx = L\int_{\frac{x_L}{L}}^{\frac{x_R}{L}}\Phi_r(\underline{x})d\underline{x} = \langle in \rangle \tag{17}$$

$$\int_{x_L}^{x_R}\Phi_m(x)\Phi_n(x)dx = L\int_{\frac{x_L}{L}}^{\frac{x_R}{L}}\Phi_m(\underline{x})\Phi_n(\underline{x})d\underline{x} = \langle in \rangle$$

In equation (17), the limits of integration $x_R/L$ and $x_L/L$ are typically 0 to 1 or $-\frac{1}{2}$ to $+\frac{1}{2}$ depending on where the coordinate system has been placed. Equation (18) is the same as equation (14), except all the non-dimensional relationships have been included:

$$\frac{\hat{k}GA_t}{EI_t}\left(\frac{1}{L}\frac{\partial^2 \underline{\Phi}_r(\underline{x})}{\partial \underline{x}^2} - \frac{1}{L}\frac{\partial \underline{\Psi}_r(\underline{x})}{\partial \underline{x}}\right)\underline{\eta}_r(\underline{t}) - \frac{\rho A \omega_1^2 L}{EI_t}\underline{\Phi}_r(\underline{x})\frac{\partial \underline{\eta}_r(\underline{t})}{\partial \underline{t}^2} - \tag{18}$$

$$\frac{d\omega_1 L}{EI_t}\underline{\Phi}_r(\underline{x})\frac{\partial \underline{\eta}_r(\underline{t})}{\partial \underline{t}} - \ldots - \frac{2\rho_f A_f v_f \omega_1}{EI_t}\frac{\partial \underline{\Phi}_r(\underline{x})}{\partial \underline{x}}\frac{\partial \underline{\eta}_r(\underline{t})}{\partial \underline{t}} -$$

$$\frac{\rho_f A_f v_f^2}{EI_t}\frac{1}{L}\frac{\partial^2 \underline{\Phi}_r(\underline{x})}{\partial \underline{x}^2}\underline{\eta}_r(\underline{t}) + \frac{1}{EI_t}F(x_{\underline{drv}},\underline{t}) = 0$$

$$\frac{1}{L^2}\frac{\partial^2 \underline{\Psi}_r(\underline{x})}{\partial \underline{x}^2}\underline{\eta}_r(\underline{t}) + \frac{(PA_f - S)}{EI_t}\frac{\partial \underline{\Phi}_r(\underline{x})}{\partial \underline{x}}\underline{\eta}_r(\underline{t}) +$$

-continued $$\frac{\hat{k}GA_t}{EI_t}\left(\frac{\partial \Phi_r(x)}{\partial x} - \Psi_r(x)\right)\eta_r(t) - \ldots \frac{\rho I \omega_1^2}{EI_t}\Psi_r(x)\frac{\partial \eta_r(t)}{\partial t^2} = 0$$

Multiplying through equation (18) by $L^2$ and $L$, respectively:

$$\frac{\hat{k}GA_tL^2}{EI_t}\left(\frac{1}{L}\frac{\partial^2 \Phi_r(x)}{\partial x^2} - \frac{1}{L}\frac{\partial \Psi_r(x)}{\partial x}\right)\eta_r(t) - \frac{\rho A\omega_1^2 L^4}{EI_t}\frac{1}{L}\Phi_r(x)\frac{\partial^2 \eta_r(t)}{\partial t^2} - \quad (19)$$

$$\frac{d\omega_1 L^4}{EI_t}\frac{1}{L}\Phi_r(x)\frac{\partial \eta_r(t)}{\partial t} - \ldots \frac{2\rho_f A_f v_f \omega_1 L^3}{EI_t}\frac{1}{L}\frac{\partial \Phi_r(x)}{\partial x}\frac{\partial \eta_r(t)}{\partial t} -$$

$$\frac{\rho_f A_f v_f^2 L^2}{EI_t}\frac{1}{L}\frac{\partial^2 \Phi_r(x)}{\partial x^2}\eta_r(t) + \frac{L^2}{EI_t}F(x,t) = 0$$

$$\frac{1}{L}\frac{\partial^2 \Psi_r(x)}{\partial x^2}\eta_r(t) + \frac{(PA_f-S)L^2}{EI_t}\frac{1}{L}\frac{\partial \Phi_r(x)}{\partial x}\eta_r(t) + \frac{\hat{k}GA_tL^2}{EI_t}$$

$$\left(\frac{1}{L}\frac{\partial \Phi_r(x)}{\partial x} - \frac{1}{L}\Psi_r(x)\right)\eta_r(t) - \ldots \frac{\rho I \omega_1^2 L^2}{EI_t}\frac{1}{L}\Psi_r(x)\frac{\partial^2 \eta_r(t)}{\partial t^2} = 0$$

In equation (19), S is positive for tension, therefore S is negative when the tension is positive:

$$\underline{\rho A} = \frac{\rho A \omega_1^2 L^4}{EI_t} \quad \underline{S} = \frac{(PA_f - S)L^2}{EI_t} \quad \underline{\rho I} = \frac{\rho I \omega_1^2 L^2}{EI_t} \quad (20)$$

$$\underline{A} = \frac{\rho_f A_f v_f^2 L^2}{EI_t} \quad \underline{B} = \frac{\hat{k}GAL^2}{EI_t} \quad \underline{\dot{m}} = \frac{\rho_f A_f v_f^2}{EI_t}$$

$$\underline{f} = \frac{L^3}{EI_t}f(x,t) \quad \underline{E} = \frac{L^2}{EI_t}F(x_{drv},t) \quad \underline{d_r} = \frac{2\zeta_r \omega_r \rho A \omega_1 L^4}{EI_t}$$

Putting equation (19) in compact matrix form:

$$\begin{bmatrix}\underline{\rho A} & 0 \\ 0 & \underline{\rho I}\end{bmatrix}\begin{Bmatrix}\frac{1}{L}\Phi_r(x) \\ \frac{1}{L}\Psi_r(x)\end{Bmatrix}\frac{\partial^2 \eta_r(t)}{\partial t^2} + \begin{bmatrix}\underline{d}+2\underline{\dot{m}}\frac{\partial \Box}{\partial \underline{x}} & 0 \\ 0 & 0\end{bmatrix}\begin{Bmatrix}\frac{1}{L}\Phi_r(x) \\ \frac{1}{L}\Psi_r(x)\end{Bmatrix}\frac{\partial \eta_r(t)}{\partial t} + \ldots \quad (21)$$

$$\begin{bmatrix}(\underline{A}-\underline{B})\frac{\partial^2 \Box}{\partial \underline{x}^2} & \underline{B}\frac{\partial \Box}{\partial \underline{x}} \\ -(\underline{S}+\underline{B})\frac{\partial \Box}{\partial \underline{x}} & \underline{B}\Box - \frac{\partial^2 \Box}{\partial \underline{x}}\end{bmatrix}\begin{Bmatrix}\frac{1}{L}\Phi_r(x) \\ \frac{1}{L}\Psi_r(x)\end{Bmatrix}\eta_r(t) = \begin{Bmatrix}\underline{F} \\ 0\end{Bmatrix}$$

It may be noted that the mode shape functions $\Phi_r(x)$ and $\Psi_r(x)$ are non-dimensional. The 1/L term is carried along to non-dimensionalize the integration when calculating orthogonality. The "box" symbol is a placeholder for the differential operator. The first term of equation (21) accounts for all the mass and inertia of the beam. The second term accounts for proportional damping and the Coriolis effects. The third term accounts for the stiffness, centrifugal forces, pressure, and tension in the beam. The stiffness matrix is mainly diagonal with some slightly skew symmetric terms.

To calculate the orthogonality, or "self-adjointedness" of any two modes m and r, each term of the differential equation may be integrated over the entire length of the beam:

$$\int_{x_L}^{x_R}\begin{Bmatrix}\Phi_m(x) \\ \Psi_m(x)\end{Bmatrix}^T\begin{bmatrix}\underline{\rho A} & 0 \\ 0 & \underline{\rho I}\end{bmatrix}\begin{Bmatrix}\frac{1}{L}\Phi_r(x) \\ \frac{1}{L}\Psi_r(x)\end{Bmatrix}dx\frac{\partial^2 \eta_r(t)}{\partial t^2} + \quad (22)$$

$$\int_{x_L}^{x_R}\begin{Bmatrix}\Phi_m(x) \\ \Psi_m(x)\end{Bmatrix}^T\begin{bmatrix}\underline{d}+2\underline{\dot{m}}\frac{\partial \Box}{\partial \underline{x}} & 0 \\ 0 & 0\end{bmatrix}\begin{Bmatrix}\frac{1}{L}\Phi_r(x) \\ \frac{1}{L}\Psi_r(x)\end{Bmatrix}dx\frac{\partial \eta_r(t)}{\partial t} +$$

$$\ldots \int_{x_L}^{x_R}\begin{Bmatrix}\Phi_m(x) \\ \Psi_m(x)\end{Bmatrix}^T\begin{bmatrix}(\underline{A}-\underline{B})\frac{\partial^2 \Box}{\partial \underline{x}^2} & \underline{B}\frac{\partial \Box}{\partial \underline{x}} \\ -(\underline{S}+\underline{B})\frac{\partial \Box}{\partial \underline{x}} & \underline{B}\Box - \frac{\partial^2 \Box}{\partial \underline{x}^2}\end{bmatrix}$$

$$\begin{Bmatrix}\frac{1}{L}\Phi_r(x) \\ \frac{1}{L}\Psi_r(x)\end{Bmatrix}dx\eta_r(t) = \begin{Bmatrix}\Phi_m(x_{drv}) \\ \Psi_m(x_{drv})\end{Bmatrix}^T\begin{Bmatrix}\underline{F} \\ 0\end{Bmatrix}$$

Modifying the integration such that the integration is non-dimensionalized over the length L:

$$L\int_{\frac{x_L}{L}}^{\frac{x_R}{L}}\begin{Bmatrix}\Phi_m(x) \\ \Psi_m(x)\end{Bmatrix}^T\begin{bmatrix}\underline{\rho A} & 0 \\ 0 & \underline{\rho I}\end{bmatrix}\begin{Bmatrix}\frac{1}{L}\Phi_r(x) \\ \frac{1}{L}\Psi_r(x)\end{Bmatrix}d\underline{x}\frac{\partial^2 \eta_r(t)}{\partial t^2} + \quad (23)$$

$$L\int_{\frac{x_L}{L}}^{\frac{x_R}{L}}\begin{Bmatrix}\Phi_m(x) \\ \Psi_m(x)\end{Bmatrix}^T\begin{bmatrix}\underline{d}+2\underline{\dot{m}}\frac{\partial \Box}{\partial \underline{x}} & 0 \\ 0 & 0\end{bmatrix}\begin{Bmatrix}\frac{1}{L}\Phi_r(x) \\ \frac{1}{L}\Psi_r(x)\end{Bmatrix}d\underline{x}\frac{\partial \eta_r(t)}{\partial t} +$$

$$\ldots L\int_{\frac{x_L}{L}}^{\frac{x_R}{L}}\begin{Bmatrix}\Phi_m(x) \\ \Psi_m(x)\end{Bmatrix}^T\begin{bmatrix}(\underline{A}-\underline{B})\frac{\partial^2 \Box}{\partial \underline{x}^2} & \underline{B}\frac{\partial \Box}{\partial \underline{x}} \\ -(\underline{S}+\underline{B})\frac{\partial \Box}{\partial \underline{x}} & \underline{B}\Box - \frac{\partial^2 \Box}{\partial \underline{x}}\end{bmatrix}$$

$$\begin{Bmatrix}\frac{1}{L}\Phi_r(x) \\ \frac{1}{L}\Psi_r(x)\end{Bmatrix}d\underline{x}\eta_r(t) = \begin{Bmatrix}\Phi_m(x_{drv}) \\ \Psi_m(x_{drv})\end{Bmatrix}^T\begin{Bmatrix}\underline{F} \\ 0\end{Bmatrix}$$

The length L cancels out, yielding non-dimensional modal mass, damping, Coriolis, and stiffness matrices mr, dr, cr, kr:

$$\underline{mr}_{m,n} = \int_{\frac{x_L}{L}}^{\frac{x_R}{L}}\begin{Bmatrix}\Phi_m(x) \\ \Psi_m(x)\end{Bmatrix}^T\begin{bmatrix}\underline{\rho A} & 0 \\ 0 & \underline{\rho I}\end{bmatrix}\begin{Bmatrix}\Phi_r(x) \\ \Psi_r(x)\end{Bmatrix}d\underline{x} \quad (24)$$

$$\underline{kr}_{m,n} = \int_{\frac{x_L}{L}}^{\frac{x_R}{L}}\begin{Bmatrix}\Phi_m(x) \\ \Psi_m(x)\end{Bmatrix}^T\begin{bmatrix}(\underline{A}-\underline{B})\frac{\partial^2 \Box}{\partial \underline{x}^2} & \underline{B}\frac{\partial \Box}{\partial \underline{x}} \\ -(\underline{S}+\underline{B})\frac{\partial \Box}{\partial \underline{x}} & \underline{B}\Box - \frac{\partial^2 \Box}{\partial \underline{x}^2}\end{bmatrix}\begin{Bmatrix}\Phi_r(x) \\ \Psi_r(x)\end{Bmatrix}d\underline{x} \quad (25)$$

$$\underline{dr}_{m,n} + \underline{cr}_{m,n} = \int_{\frac{x_L}{L}}^{\frac{x_R}{L}}\begin{Bmatrix}\Phi_m(x) \\ \Psi_m(x)\end{Bmatrix}^T\begin{bmatrix}\underline{d}+2\underline{\dot{m}}\frac{\partial \Box}{\partial \underline{x}} & 0 \\ 0 & 0\end{bmatrix}\begin{Bmatrix}\Phi_r(x) \\ \Psi_r(x)\end{Bmatrix}d\underline{x} \quad (26)$$

$$N_m = \begin{Bmatrix}\Phi_m(x) \\ \Psi_m(x)\end{Bmatrix}^T\begin{Bmatrix}\underline{F} \\ 0\end{Bmatrix} \quad (27)$$

The modal differential equation of motion for flow can be reduced to matrix form:

$$[mr]\{\ddot{\eta}(t)\} + [dr+cr]\{\dot{\eta}(t)\} + [kr]\{\eta(t)\} = \{N_r\} \quad (28)$$

The modal response $\{\eta(t)\}$ may be considered to be harmonic, such that equation (28) is modified to equation (29) (for a beam with fixed ends, it would be preferable to drive the sensor conduit at $\omega=\omega_1$):

$$(-\omega^2[mr]+j\omega[dr+cr]+[kr])\{\eta(t)\}=\{N\} \quad (29)$$

The quantity in the parentheses on the left may be considered a "modal dynamic stiffness" analogous to that described above with reference to equations (6) and (7). A non-dimensional modal response can be calculated by taking the inverse of the modal dynamic stiffness (the modal frequency response function) and bringing it over to the right hand side to yield:

$$\{\eta(t)\} = (-\omega^2[mr] + j\omega[dr+cr] + [kr])^{-1}\{N\} \quad (30)$$

At this point, a simplifying assumption may be made that the beam acts like a Euler/Bernoulli beam, i.e. $\rho I \approx A \approx S \approx 0$. For a Euler/Bernoulli beam, the modal stiffness may be expressed as:

$$kr_{m,r} = EI_t \int_{x_L}^{x_R} \frac{\partial^2 \Phi_m(x)}{\partial x^2} \frac{\partial^2 \Phi_r(x)}{\partial x^2} dx \quad (31)$$

$$\underline{kr_{m,r}} = \int_{\frac{x_L}{L}}^{\frac{x_R}{L}} \frac{\partial^2 \Phi_m(x)}{\partial x^2} \frac{\partial^2 \Phi_r(x)}{\partial x^2} dx$$

This allows the non-dimensional constants to be pulled out from the integration such that equation (31) simplifies to equation (32), where the ^ indicates a constant matrix due to integration of the mode shapes:

$$\{\eta(t)\} = (-\omega^2 \rho A[\hat{m}r] + j\omega(d[\hat{d}r] + \dot{m}[\hat{c}r]) + [\hat{k}r])^{-1}\{N\} \quad (32)$$

A conduit having substantially fixed ends can be assumed to have a response that approximates that of a beam with fixed ends at a first bend mode frequency. Therefore, the physical response of the conduit can be approximated as if it were the sum of the product of fixed beam mode shapes times the fixed beam modal response, which means that mode shapes may be assumed to be effectively held constant at the excitation frequency. Therefore the modal mass, damping, Coriolis and stiffness matrices $[\hat{m}r]$, $[\hat{d}r]$, $[\hat{c}r]$, and $[\hat{k}r]$ can be assumed to be constant. Assuming the modal excitation doesn't change, the only variables in equation (32) that change are $\rho A$, d, and $\dot{m}$. It may also be assumed that $)\omega=1$, as the first bending mode is typically driven in a straight-tube Coriolis meter. Theoretically, mass flow can be measured in modal domain because $\{\eta(t)\}$ is complex with flow:

$$\rho A = ((\rho_t A_t + \rho_f A_f)L)\omega_1^2 \frac{L^3}{EI_t} \quad (33)$$

$$\dot{m} = \frac{\rho_f A_f v_f^2}{EI_t}$$

where $$(\rho_t A_t + \rho_f A_f)L\left(\frac{lbf \sec^2}{in}\right)$$

represents the mass of the flow tube and the fluid inside it, $\omega_1$ is the drive frequency (assuming driving of the first bending mode), and $$\frac{EI_t}{L^3}\left(\frac{lbf}{in}\right)$$

is proportional to the stiffness of the beam.

Expanding the non-dimensional parameters and factoring out the common variables yields:

$$\{\eta(t)\} = \frac{EI_t}{((\rho A)L)L^3}\left(-\omega^2[\hat{m}r] + 2j\zeta'[\omega_A]\omega[\hat{d}r] + 2j\frac{(\rho_f A_f v_f)}{((\rho A)L)L^3}[\hat{c}r] + \frac{EI_t}{((\rho A)L)L^3}[\hat{k}r]\right)^{-1}\{N\} \quad (34)$$

If fluid density stays substantially constant in equation (34) with relation to the total mass per unit length, the calibration bias is proportional to $EI_t/L^3$. If this assumption is made, the remaining variables in equation (34) are $EI_t$, $\rho_f A_f v_f$, $\omega$, and $\zeta$, where $\omega$ is the excitation frequency, $\rho_f A_f v_f$ is the mass flow rate, and $EI_t$ is the flexural rigidity of the conduit. In a flow sensor application, the length typically is known and fixed by design. If the flow sensor conduit is constrained to substantially fixed boundary conditions, the mode shapes and modal frequencies may also be known. Therefore, the modal mass, damping, Coriolis and stiffness matrices $[\hat{m}r]$, $[\hat{d}r]$, $[\hat{c}r]$, and $[\hat{k}r]$ can be assumed to be constant. So the physical response can be transformed to any number of physical response points, p, where r is the number of modes. As long as the conduit ends are substantially fixed, the modal matrix used to transform the modal response back to a physical response is known:

$$\{y(x,t)\}_p = [\Phi_r(x_p)]_{p,r} L\{\eta(t)\}_r \quad (35)$$

The physical response is complex. A mass flow measurement may be made from the physical response using time difference or phase measurements as described above.

From equation (34) and (35), the only unknowns are the mass/unit length and $EI_t$. If a simplifying assumption that the sensor conduit is an Euler beam is made, the eigenvalues, $\lambda_r$, of the mode shapes may be determined. Therefore, if $EI_t$ is measured, a calibration factor may be determined to a substantially high degree of accuracy, for example, <1% error. For an Euler/Bernoulli beam with fixed/fixed boundary conditions, the eigenvalues $(\lambda_r)$ may be known. The frequencies of at least the drive mode are typically known. Therefore $$\frac{\rho A}{EI_t}$$

can be estimated from the frequency and eigenvalue information as follows:

$$\lambda_r^4 = \omega_r^2 \frac{\rho A}{EI_t} \quad (36)$$

For a more accurate sensor, secondary influences of shear stiffness and rotary inertia that effect the flow conduit's frequencies and boundary conditions may be considered. Tension effects may also be considered. The following shows how to back out the first four eigenvalue parameters in equation (20). Equation (20) provides the following non-dimensional relationships:

$$\underline{\rho A} = \frac{\rho A \omega_1^2 L^4}{EI_t} \quad \underline{S} = \frac{(PA_f - S)L^2}{EI_t} \quad \underline{\rho I} = \frac{\rho I \omega_1^2 L^2}{EI_t} \quad \underline{B} = \frac{\hat{k}GAL^2}{EI_t} \quad (37)$$

From equation (37), an equation for the frequencies of the modes can be derived, using the real normal mode assumptions:

$$det\left\|\begin{matrix}(\underline{A}-\underline{B})\lambda_r^2 - \underline{\rho A}\,\omega^2 & \underline{B}\lambda_r \\ -(\underline{S}+\underline{B})\lambda_r & \underline{B}-\lambda_r^2 - \underline{\rho I}\,\omega^2\end{matrix}\right\| = 0 \quad (38)$$

Equation (38) can be rearranged in terms of the eigenvalues, modal frequencies, and the non-dimensional eigenvalue parameters, yielding:

$$(\lambda 1_r^2 + \lambda 2_r^2)^2 = [1 \quad \omega_r^2 \quad \omega_r^4] \quad (39)$$

$$\left\{\begin{matrix}(\underline{A}+\underline{S})^2 \\ 2(\underline{A}+\underline{S})\left(\frac{\underline{\rho A}}{\underline{B}}+\underline{\rho I}\right) - 4\underline{\rho A} \\ \left(\frac{\underline{\rho A}}{\underline{B}}+\underline{\rho I}\right)^2 - 4\frac{\underline{\rho A}}{\underline{B}}\underline{\rho I}\end{matrix}\right\} = [1 \quad \omega_r^2 \quad \omega_r^4]\{V1\}^2$$

$$\lambda 1_r^2 - \lambda 2_r^2 = [1 \quad \omega_r^2]\left\{\begin{matrix}-(\underline{A}+\underline{S}) \\ -\left(\frac{\underline{\rho A}}{\underline{B}}+\underline{\rho I}\right)\end{matrix}\right\} = [1 \quad \omega_r^2]\{V2\}$$

For a fixed/fixed beam, or a beam with other quantifiable boundary conditions, the left-hand side of equation (39) may be known and considered constant for many modes. If modal frequencies for at least three modes are measured, one can solve for $\rho A$, $S$, $\rho I$, and $B$:

$$\underline{S} = -V2_0 = -\sqrt{VI_0} \quad (40)$$

$$\underline{\rho A} = \frac{VI_1 + 2V2_0 V2_1}{4}$$

$$\underline{B} = -2\underline{\rho A}\frac{V2_2}{V2_2^2 - VI_3} - 2\underline{\rho A}\left[\left(\frac{V2_2}{V2_2^2 - VI_3}\right)^2 - \frac{1}{V2_2^2 - VI_3}\right]^{\frac{1}{2}}$$

$$\underline{\rho I} = -V2_2 - \frac{-\underline{\rho A}}{\underline{B}}$$

The eigenvalue parameters may be broken down into $\rho A, \rho I, EI_t, \hat{k}GA_t$, and $S$ using a modal mass determined from frequency response function (FRF) measurements. One way to measure $\rho A$ and $\rho I$ is to measure the modal mass of the flow conduit. A circle fit method from a limited amount of FRF measurements can provide an estimate of the mode's eigenvalue and residue. The modal mass $m_r$ of an r-th mode may be calculated from the residue $R_{qqr}$, where qqr refers to a driving point response of the r-th mode:

$$R_{qqr} = \Phi_{qqr}^2 \frac{-j}{2m_r\omega_r} \quad (41)$$

$$m_r = \Phi_{qqr}^2 \frac{-j}{2R_{qqr}\omega_r}$$

A least squares estimate of $\rho A$ and $\rho I$ may then be generated:

$$\begin{bmatrix}\ddots \\ & mr & \\ & & \ddots\end{bmatrix}_{measured} = \rho A[\hat{m}r_\Phi] + \rho I[\hat{m}r_\Psi] \quad (42)$$

Now $[\hat{m}r_\Phi]$ and $[\hat{m}r_\Psi]$ can be considered as near constant (but not diagonal) matrices, and may be pulled from equation (42). A least squares estimate for $\rho A$ and $\rho I$ may be made by stacking the column vectors and taking the pseudo inverse:

$$\left\{\begin{matrix}\rho A \\ \rho I\end{matrix}\right\} = \begin{bmatrix}\{\hat{m}r_\Phi\}_{:,1} & \{\hat{m}r_\Psi\}_{:,1} \\ \vdots & \vdots \\ \{\hat{m}r_\Phi\}_{:,r} & \{\hat{m}r_\Psi\}_{:,r}\end{bmatrix}\left(\begin{matrix}\{mr_{measured}\}_{:,1} \\ \vdots \\ \{mr_{measured}\}_{:,r}\end{matrix}\right) \quad (43)$$

Generally, $\rho A$ and $\rho I$ will change as the density of the fluid changes. At the time of installation, the fluid density will probably be unknown. However the desired parameters $EI_t$ and $\hat{k}GA_t$ are generally time invariant, although E and G change slightly with temperature and $I_t$ and $A_t$ may change with pressure. Therefore, at the time of installation, $\rho A$ and $\rho I$ can be measured and used to calculate $EI_t$ and $\hat{k}GA$.

With this information in hand, an in situ estimate of a calibration factor may be made. $\rho A$ may change the calibration bias if mass flow measurements are being made from phase measurements. Such a fluid density effect on calibration bias can be reduced by using time difference measurements instead of phase measurements.

A potential disadvantage of the above technique is that measurement of the modal mass generally requires determination of a driving point response, e.g., a response at the location at which the flow conduit is driven. Such a driving point response is not required, however, to measure flow. Therefore, if it is undesirable to measure driving point response during operation of a flow sensor, one could use a motion transducer at the driving point for installation/calibration purposes and then remove the transducer (or ignore its output) during normal operation.

Exemplary Calibration Apparatus and Operations

Figure 3:
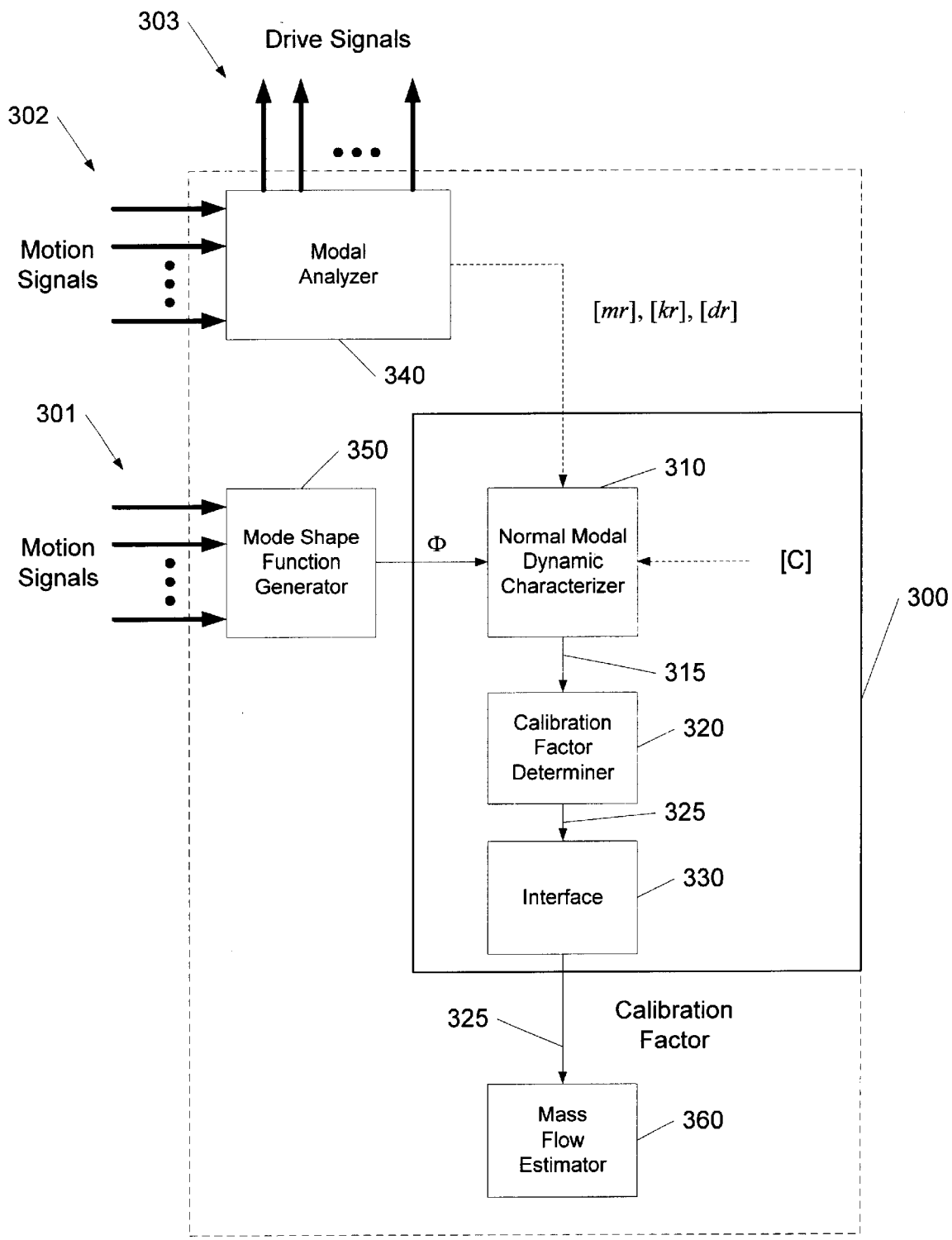
FIG. 3 is a schematic diagram of a calibration factor generator circuit according to embodiments of the present invention.

FIG. 3 illustrates an exemplary implementation of a calibration factor generator circuit 300 according to embodiments of the present invention. The calibration factor generator circuit 300 is operative to determine a calibration factor 325 for a flow sensor. As shown, the calibration factor generator circuit 300 includes a normal modal dynamic characterizer circuit 310 that is operative to generate a normal modal dynamic characterization of conduit motion, e.g., a representation of a differential equation of motion in a modal domain comprising a plurality of normal modes. The calibration factor generator circuit 300 also includes a calibration factor determiner circuit 320 that is operative to determine a calibration factor 325 from the normal modal dynamic characterization 315. For example, the calibration factor determiner circuit 320 may be operative to generate a solution to the modal differential equation of motion from the normal modal characterization 315, and to determine the calibration factor from this solution, e.g., by generating a time difference or phase relationship estimate from the solution, and determining the calibration factor 325 therefrom. The calibration factor generator circuit 300 further includes an interface circuit 330 operative to convey the determined calibration factor 325 to a mass flow estimator 360 of a mass flow sensor.

As illustrated in FIG. 3, the normal modal dynamic characterizer circuit 310 may generate the normal modal characterization 315 using a mode shape function Φ generated by a mode shape function generator circuit 350. The mode shape function generator circuit 350 generates the mode shape function Φ from motion signals 301 that represent motion of the conduit of the mass flow sensor, as described in the aforementioned U.S. patent application Ser. No. 09/941,332. The normal modal dynamic characterizer circuit 310 may also use modal mass, damping and stiffness terms [mr], [dr], [kr] generated by a modal analyzer circuit 340, or may generate such information using the mode shape function Φ, as described above with reference to equations (24), (25), and (27). In performing modal analysis of the flow sensor conduit, the modal analyzer circuit 340 may, for example, generate drive signals 303 to excite the mass flow sensor conduit and may process motion signals 302 representing motion in response to this excitation using, for example, conventional modal analysis techniques. The normal modal dynamic characterizer circuit 310 may also use a spatial Coriolis matrix [C] to generate a modal Coriolis matrix term of the normal modal dynamic characterization 315, as described with reference to equation (3), or may determine such a modal Coriolis term directly from the mode shape function Φ.

As conceptually illustrated in FIG. 3, the calibration factor generator circuit 300 may comprise a separate unit, or may be combined with the modal analyzer circuit 340 and/or the mode shape function generator circuit 350 and/or the mass flow estimator circuit 360. For example, all or part of the calibration factor generator circuit 300 may be integrated with the mass flow estimator circuit 360 are integrated in a common data processor, such as a microcontroller, microprocessor or digital signal processor (DSP) that forms part of a mass flow sensor apparatus, such that, for example, the normal modal dynamic characterizer circuit 310, the calibration factor determiner circuit 320, the interface circuit 330 and the mass flow estimator circuit 360 are embodied as software objects, modules or the like that are configured to cooperatively execute on the common data processor. Alternatively, all or part of the calibration factor generator circuit 300 may be integrated with the mode shape function generator circuit 350 and/or the modal analyzer circuit 340 in, for example, a common data processing apparatus used in a piece of test or process control equipment, such that, for example, these circuits are embodied as cooperatively executing objects, modules or the like. It will be appreciated that, in general, the calibration factor generator circuit 300 may be implemented using special purpose hardware, software or firmware executing on a general or special purpose data processor, or combinations thereof.

Figure 4:
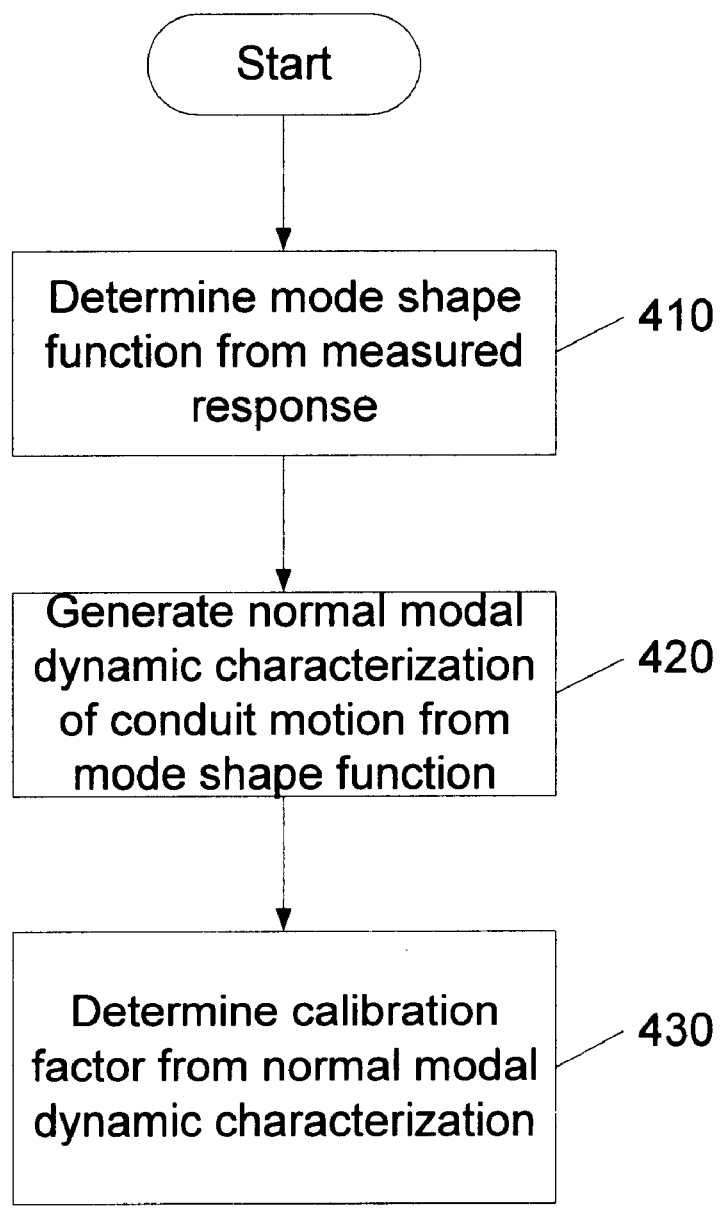
FIGS. 4, 5 and 6 are flowcharts illustrating exemplary operations for determining a calibration factor for a mass flow sensor according to embodiments of the present invention.
Figure 5:
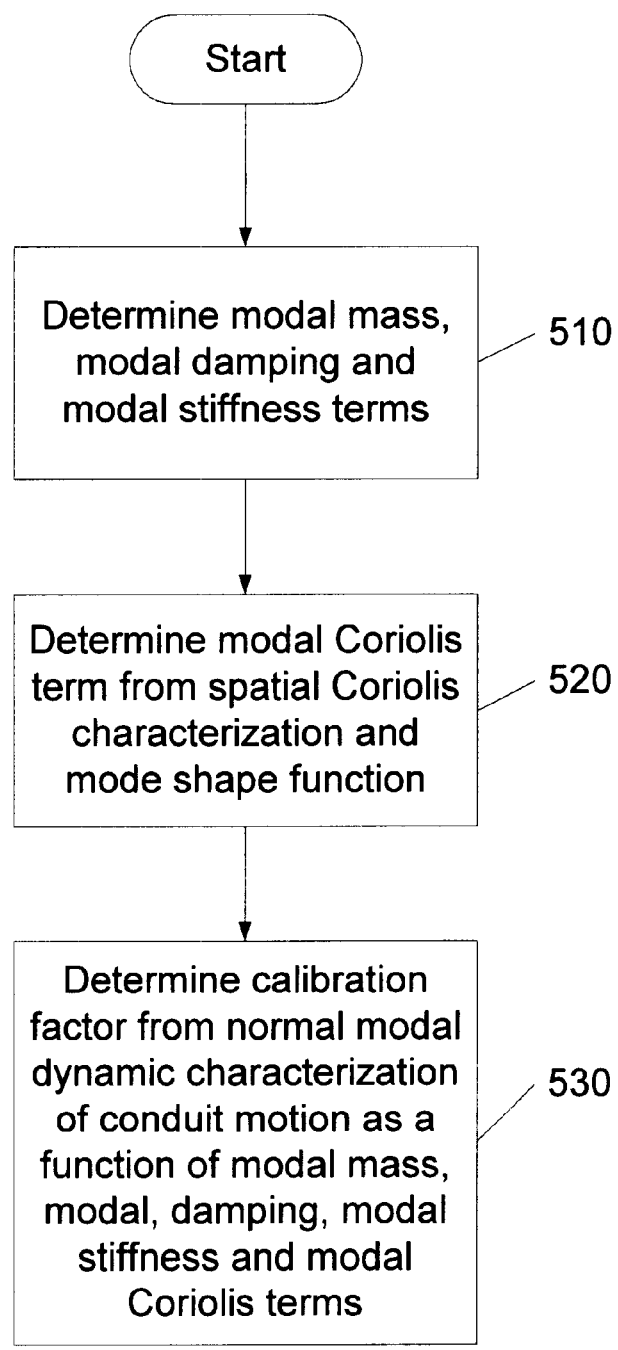
Figure 6:
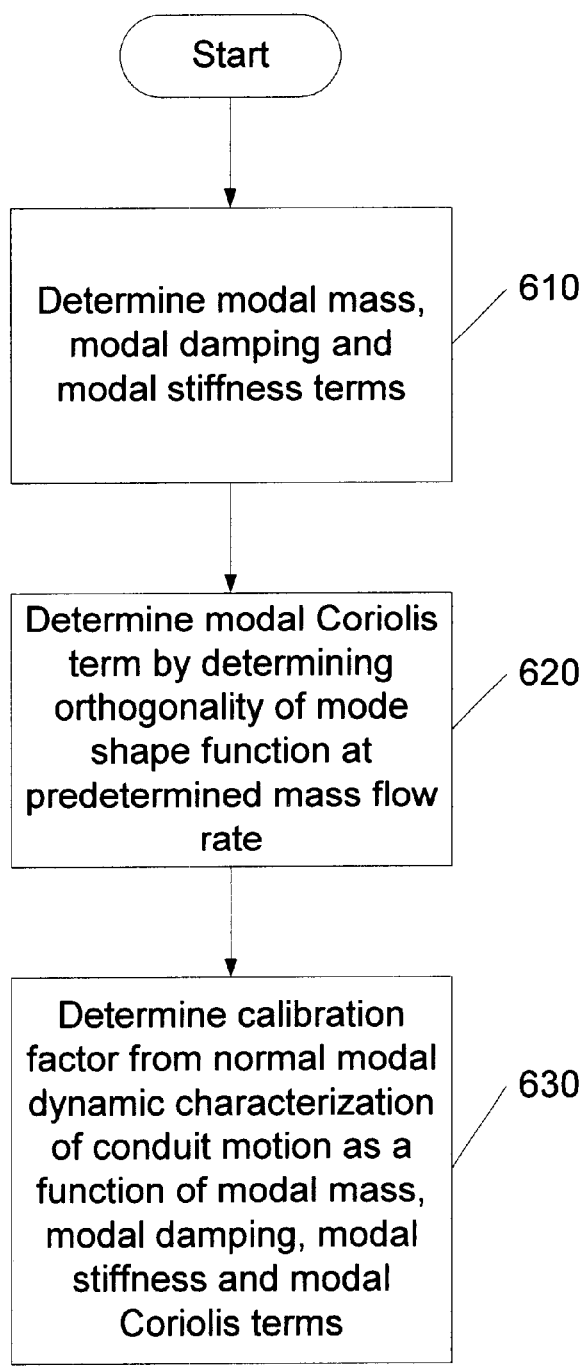

FIGS. 4–6 are flowchart illustrations of exemplary operations according to various embodiments of the present invention. Those skilled in the art will understand that the operations of these flowchart illustrations may be implemented using computer instructions. These instructions may be executed on a computer or other data processing apparatus, such as may be used to implement the calibration factor generator circuit 300 of FIG. 3, to create an apparatus (system) operative to perform the illustrated operations. The computer instructions may also be stored as computer readable program code on a computer readable medium, for example, an integrated circuit memory, a magnetic disk, a tape or the like, that can direct a computer or other data processing apparatus to perform the illustrated operations, thus providing means for performing the illustrated operations. The computer readable program code may also be executed on a computer or other data-processing apparatus to cause the apparatus to perform a computer-implemented process. Accordingly, FIGS. 4–6 support apparatus (systems), computer program products and methods for performing the operations illustrated therein.

Those skilled in the art will appreciate that the present invention may be implemented a number of other ways than the embodiments described herein. For example, computations described herein may be implemented as separate computations, or may be combined into one or more computations that achieve equivalent results. The functions described herein may, in general, be implemented using digital and/or analog signal processing techniques. Those skilled in the art will also appreciate that, although the present invention may be embodied within an apparatus such as a Coriolis mass flowmeter, or as methods which may be performed by such apparatus, the present invention may also be embodied in a apparatus configured to operate in association with a flowmeter or sensor apparatus, such as in process control apparatus. It will also be appreciated that the present invention may be embodied in an article of manufacture in the form of computer-readable instructions or program code embodied in a computer readable storage medium such as a magnetic disk, integrated circuit memory device, magnetic tape, bubble memory or the like. Such computer program code may be executed by a computer or other data processor and executed responsive to motion signals supplied from motion transducers operatively associated with a flow sensor conduit or similar structure.

FIG. 4 illustrates exemplary operations 400 for generating a calibration factor for a flow sensor according to embodiments of the present invention. A mode shape function, e.g., such as the mode shape functions described above with reference to equation (2), are determined from measured response data, e.g., from motion signals such as those produced by the motion transducers of FIG. 1 (Block 410). A normal modal dynamic characterization is then generated from the mode shape function (Block 420). For example, a modal differential equation of motion including a modal mass term, a modal stiffness term, a modal damping term and a modal Coriolis term may be generated by determining modal mass and stiffness matrices using modal analysis techniques and generating a modal Coriolis matrix from a discrete physical Coriolis matrix for a predetermined mass flow, as described above with reference to equations (3)–(15), which may be viewed as a determination of orthogonality of discrete mode shapes with respect to the spatial Coriolis characterization (e.g., the physical Coriolis matrix). Alternatively, a modal Coriolis matrix may be determined by determining an orthogonality of a continuous mode shape function (e.g., with respect to itself and other mode shape functions) for a predetermined mass flow rate, as described above with reference to equation (26), and modal mass and stiffness matrices may be determined by a similar orthogonalization, e.g., equations (24), (25), and (27), or by conventional modal analysis techniques. A calibration factor may then be determined from the normal modal characterization (Block 430). For example, a modal differential equation of motion including modal mass, stiffness, damping and Coriolis terms may be solved and translated to a spatial domain to yield an estimated spatial response from which a calibration factor may be determined, as described above with reference to equations (3), (6)–(8) and (32)–(35).

FIG. 5. illustrates exemplary operations 500 for determining a flow sensor calibration factor according to some embodiments of the present invention. Modal mass and stiffness terms of a modal differential equation of motion, e.g., the [mr] and [kr] matrices of equation (6), are determined using, for example, using conventional modal analysis techniques (Block 510). A modal Coriolis term of the equation of motion, e.g., the [cr] matrix of equation (6), is then determined from a spatial Coriolis characterization and a mode shape function, e.g., from a physical Coriolis matrix [C] as described in equation (3) (Block 520). A calibration factor is then determined from a normal modal dynamic characterization of conduit motion as a function of the modal mass, stiffness and Coriolis terms, e.g., from the modal differential equation of motion (Block 530).

FIG. 6 illustrates exemplary operations 600 for determining a flow sensor calibration factor according to other embodiments of the present invention. Modal mass and stiffness terms of a modal differential equation of motion, e.g., the [m̂r] and ⌊k̂r⌋ krimatrices of equation (34), are determined using, for example, conventional modal analysis techniques or by determining orthogonality of a mode shape function as described with reference to equations (24) and (25) (Block 610). A modal Coriolis term of the equation of motion, e.g., the [ĉr] matrix of equation (34), is then determined by determining orthogonality of a mode shape function for a predetermined mass flow rate, e.g., as described with reference to equation (26) (Block 620). A calibration factor is then determined from a normal modal dynamic characterization of conduit motion as a function of the modal mass, stiffness and Coriolis terms, e.g., from a solution of the modal differential equation of motion (Block 630).

As noted above, simplifying assumptions as to the modal behavior of a flow sensor conduit may be made if the motion of the conduit is properly constrained to provide predetermined boundary conditions. In particular, substantially fixed, homogeneous boundary conditions for at least one mode of the conduit may be achieved by affixing the ends of a sensor conduit.

Figure 7:
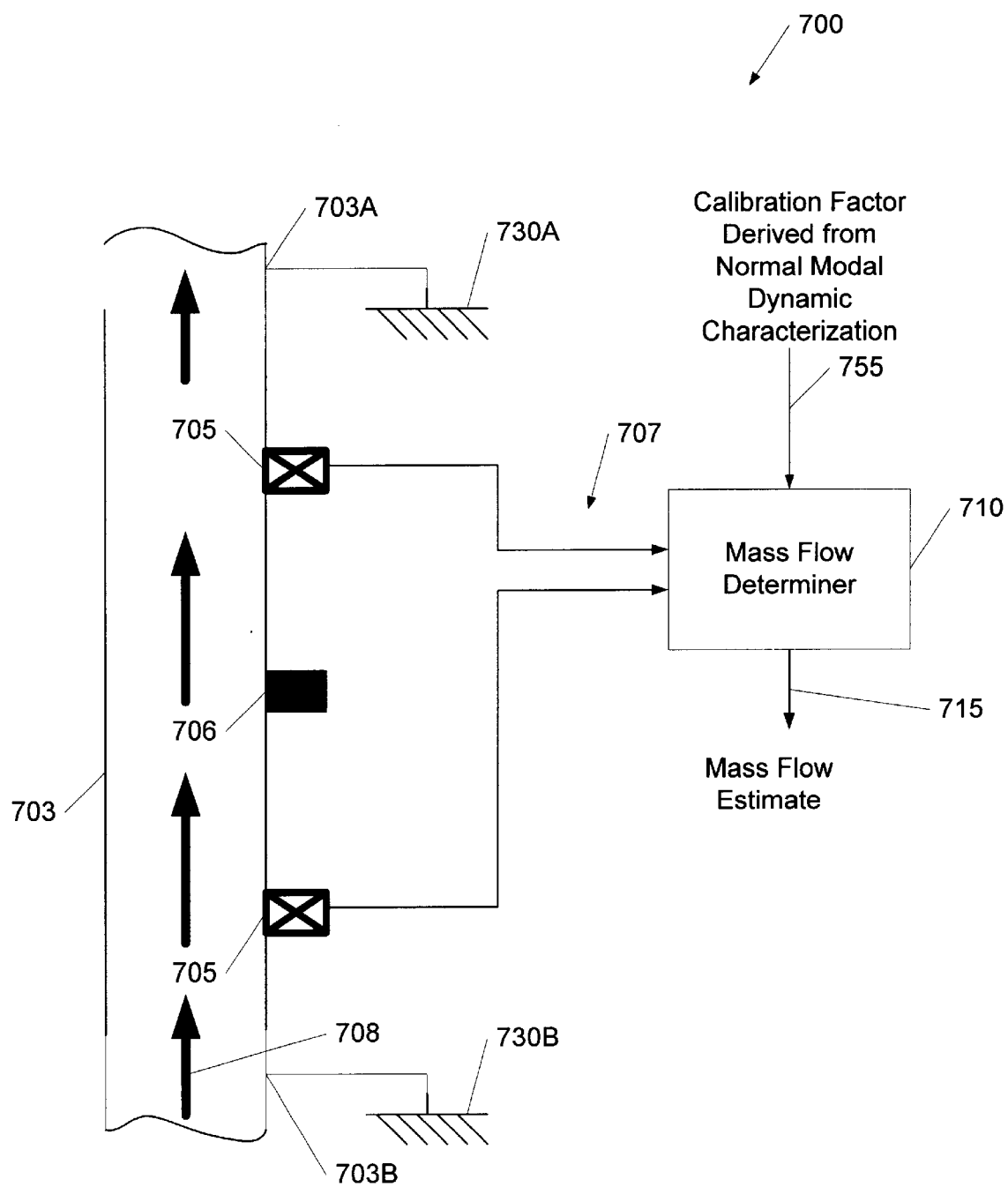
FIGS. 7, 8, 9, 10 and 11 are schematic diagrams mass flow sensor apparatus according to various embodiments of the present invention.

For example, as shown in FIG. 7, a flow sensor 700 may comprise a conduit 703 that is driven (vibrated) by an actuator 706. Motion sensors 705 generate motion signals 707 that represent motion of the conduit 703 as a material 708 flows therethrough. A mass flow determiner circuit 710 generates a mass flow estimate 715 from the motion signals 707 using a calibration factor 755 derived from a normal modal dynamic characterization of the sensor 700.

In particular, as described above, the calibration factor 755 may be derived assuming a predetermined boundary condition for a normal mode of the conduit 703, for example, assuming a fixed/fixed boundary condition for a first bending mode driven by the actuator 706. As conceptually illustrated in FIG. 7, this boundary condition may be approximated by fixing locations 703A, 703B of the conduit 703 to a substantially rigid structure 730. It will be appreciated that this fixation of the locations 703A, 703B may be achieved in number of different ways. For example, the locations 703A, 703B of the conduit 704 may be affixed to a rigid structure using clamps, welds or other fastening techniques.

It will be appreciated that according to embodiments of the present invention, such an approach can facilitate implementation of a simplified straight tube Coriolis flowmeter that does not require a mechanically-tuned balanced beam as used in many conventional straight tube sensors. It will be further appreciated that the above-described techniques can also enable practical implementation of a "clamp-on" flow sensor, i.e., a flow sensor implemented by transducers, actuators and associated circuitry with a length of pipe or other conduit that is part of a processing apparatus, e.g., an existing pipeline in a refinery, processing plant, or other installation.

Figure 8:
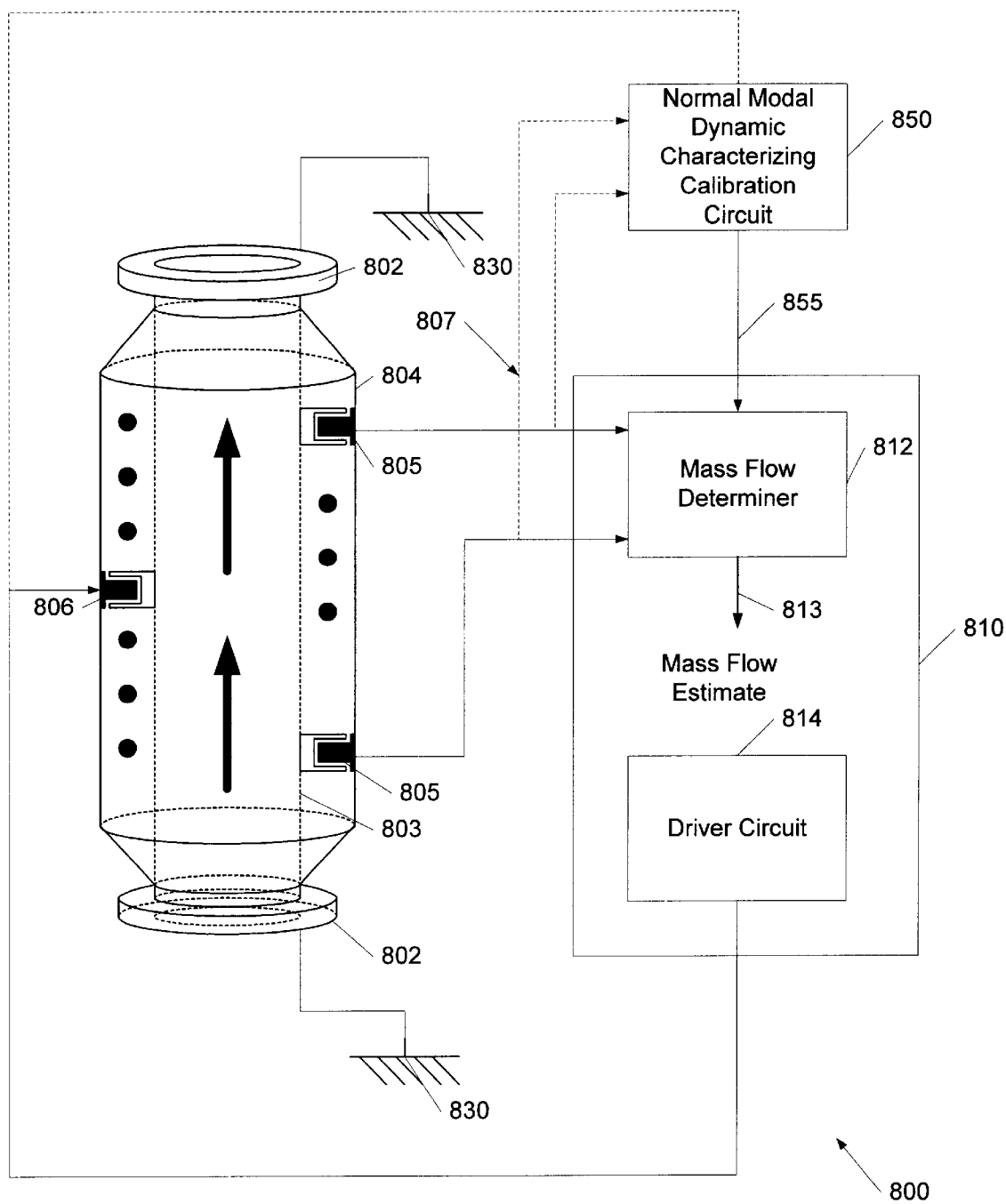

An example of a straight tube flow sensor configuration according to embodiments of the present invention is illustrated in FIG. 8. In FIG. 8, a flow sensor 800 includes a conduit 803 surrounded by and attached to a case 804. The conduit 803 is configured to receive and discharge material from send to, for example, a pipeline (not shown) attached at flanges 802. The sensor 800 further includes one or more actuators 806 that induce relative motion between the conduit 803 and the case 804. A plurality of motion transducers 805 generate motion signals 807 that represent relative motion of the conduit 803 with respect to the case 804.

The sensor interface circuit 810 includes a mass flow determiner circuit 812 that is operative to receive the motion signals 807 and to generate a mass flow estimate 813 therefrom according to a calibration factor 855. The sensor interface circuit 810 further includes a driver circuit 814 operative to control the one or more actuators 806.

The calibration factor 855 is generated by a normal modal dynamic characterizing calibration circuit 850. The calibration circuit 850 derives the calibration factor 855 from a normal modal dynamic characterization of motion of the conduit 803. As shown by the dashed line connections, the calibration circuit 850 may be operative to receive motion signals 807 generated by the transducers 805 and/or to generate drive signals to drive the one or more transducers 806. This capability may be used in determining mode shape functions and terms of a modal differential equation of motion, and other parameters needed for determination of the calibration factor 855.

As described above, the calibration factor 855 may be derived based on an assumption that the conduit 803 will be constrained to a predetermined boundary condition, such as a fixed end boundary condition for a first bending mode of the conduit 803. To approximate such a predetermined boundary condition, the motion of the conduit 803 is constrained. For example, as shown conceptually in FIG. 8, motion near the flanges 802 may be constrained to a near fixed condition by affixing the conduit 803 to a rigid structure such that motion near the flanges 802 is substantially reduced. It will be appreciated that such fixation may be achieved in a number of different ways. For example, motion near the flanges 802 may be constrained by clamping, welding or otherwise fixing a pipeline connected to the flanges 802 to a rigid structure. Fixation may also be achieved, for example, by affixing the case 804 to a rigid structure, assuming the case 804 is sufficiently rigid to constrain motion near the flanges 802.

It will be further appreciated that the sensor interface circuit 810 may implemented in a number of different ways. For example, the sensor interface circuit 810 may be implemented in electronics packages with the case 804. Alternatively, all or portions of the sensor interface circuit 810 may be positioned away from the case 804 and components therein. For example, example, all or portions of the sensor interface circuit 810 may be included in remote process control equipment connected to the one or more actuators 806 and/or the motion transducers 805.

It will be further appreciated that the calibration circuit 850 may be implemented in a number of different ways. For example, all or portions of the calibration circuit 850 may be integrated with the sensor interface circuit 810. All or portions of the calibration circuit 850 may also be included, for example, in remotely located process control or other equipment designed to interface with the sensor 800 in a plant or other environment. All or portions of the calibration circuit 850 may also be provided, for example, in test equipment (field or factory) that is configured to be connected to the sensor 800 for calibration purposes, but removed or deactivated for normal operation of the sensor 800. The sensor interface circuit 810 may also share components, such as processing circuits and driver circuits, with the calibration circuit 850.

Figure 9:
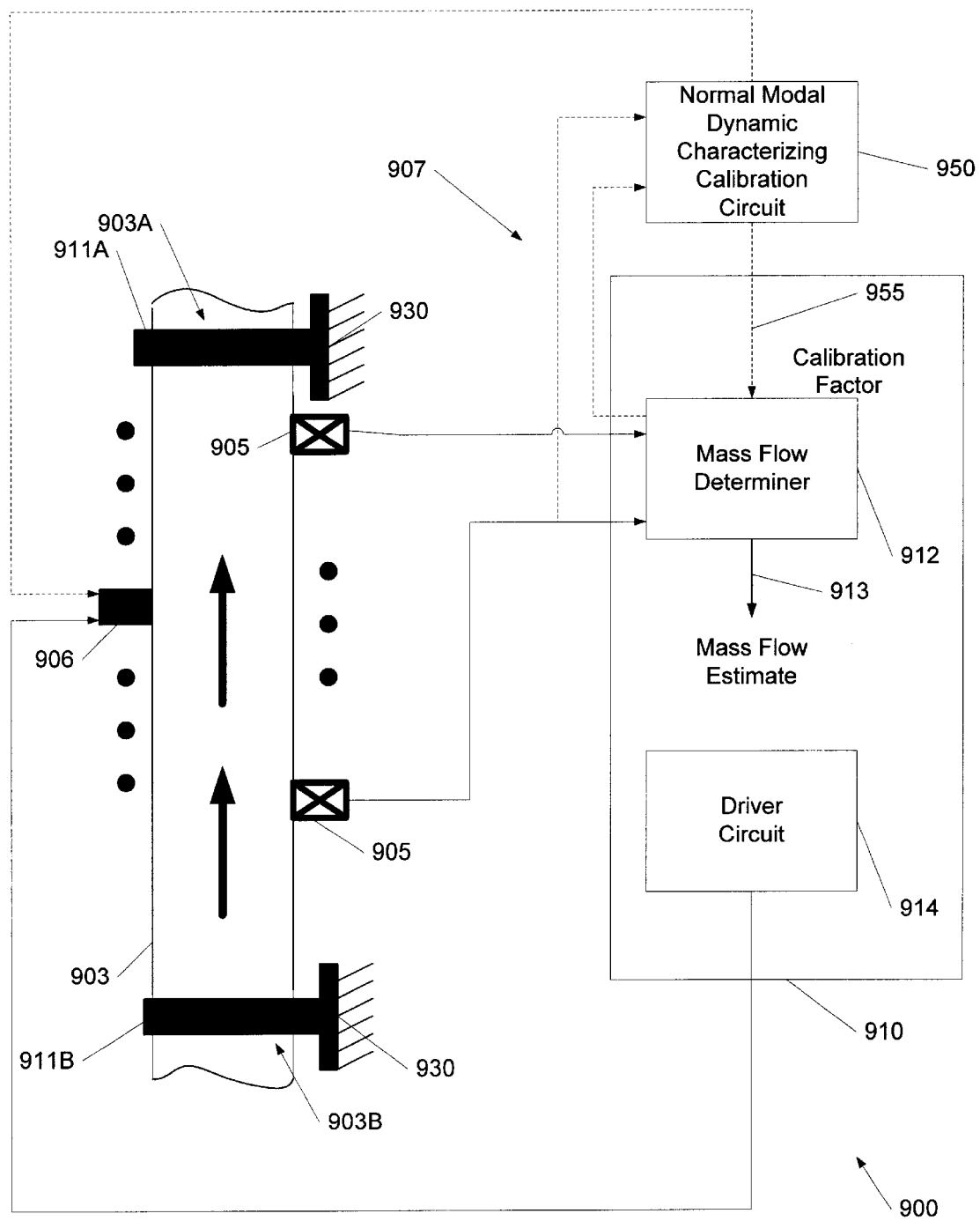

FIG. 9 illustrates an example of a "clamp-on" flow sensor configuration 900 according to other embodiments of the present invention. A pipeline 903 is clamped to a rigid structure 930 at first and second locations 903A, 903B by first and second pipeline clamps 911A, 911B. A plurality of motion transducers 905, e.g., inertial or relative transducers, are configured to engage the pipeline 903 at respective locations, and produce motion signals 907 representative of motion of the conduit 903. A sensor interface circuit 910 includes a mass flow determiner circuit 912 that is operative to process the motion signals 907 according to calibration factor 955 derived from a normal modal dynamic characterization of motion of the pipeline 903 and to generate a mass flow estimate 913 therefrom. One or more actuators 906 are also configured to engage the pipeline 903, and are driven by a driver circuit 914 included in the sensor interface circuit 910.

The calibration factor 955 is generated by a normal modal dynamic characterizing calibration circuit 950. The calibration circuit 950 derives the calibration factor 955 from a normal modal dynamic characterization of motion of the conduit 903. As shown by the dashed line connections, the calibration circuit 950 may be operative to receive motion signals 907 generated by the transducers 905 and/or to generate drive signals to drive the one or more transducers 906. This capability may be used in determining, for example, mode shape functions and terms of a modal differential equation of motion, and other parameters needed for determination of the calibration factor 955.

The calibration factor 955 may be derived based on an assumption that the conduit 903 will be constrained to a predetermined boundary condition, such as a fixed end boundary condition for a first bending mode of the conduit 903. To approximate such a predetermined boundary condition, the motion of the conduit 903 is constrained. For example, as shown in FIG. 8, motion at the first and second spaced apart locations 903A, 903B of the conduit 903 may be constrained by the clamps 911A, 911B that attach the conduit 903 to the rigid structure 930. It will be appreciated that such fixation may be achieved in other ways.

The sensor interface circuit 910 may implemented in a number of different ways. For example, the sensor interface circuit 910 may be implemented in an electronics package configured to be positioned near the actuators 905 and the driver 906. Alternatively, all or portions of the sensor interface circuit 910 may be positioned away from the transducers 905 and the one or more actuators 906. For example, example, all or portions of the sensor interface circuit 910 may be included in remote process control equipment connected to the one or more actuators 906 and/or the motion transducers 905 via communications links.

It will be further appreciated that the calibration circuit 950 may be implemented in a number of different ways. For example, all or portions of the calibration circuit 950 may be integrated with the sensor interface circuit 910. All or portions of the calibration circuit 950 may also be included, for example, in process control or other equipment. All or portions of the calibration circuit 950 may also be provided, for example, in test equipment (field or factory) that is connected to the actuators 906 and transducers 905 for calibration purposes, but removed or deactivated for normal operation. The sensor interface circuit 910 may also share components, such as signal processing circuits and driver circuits, with the calibration circuit 950.

Figure 10:
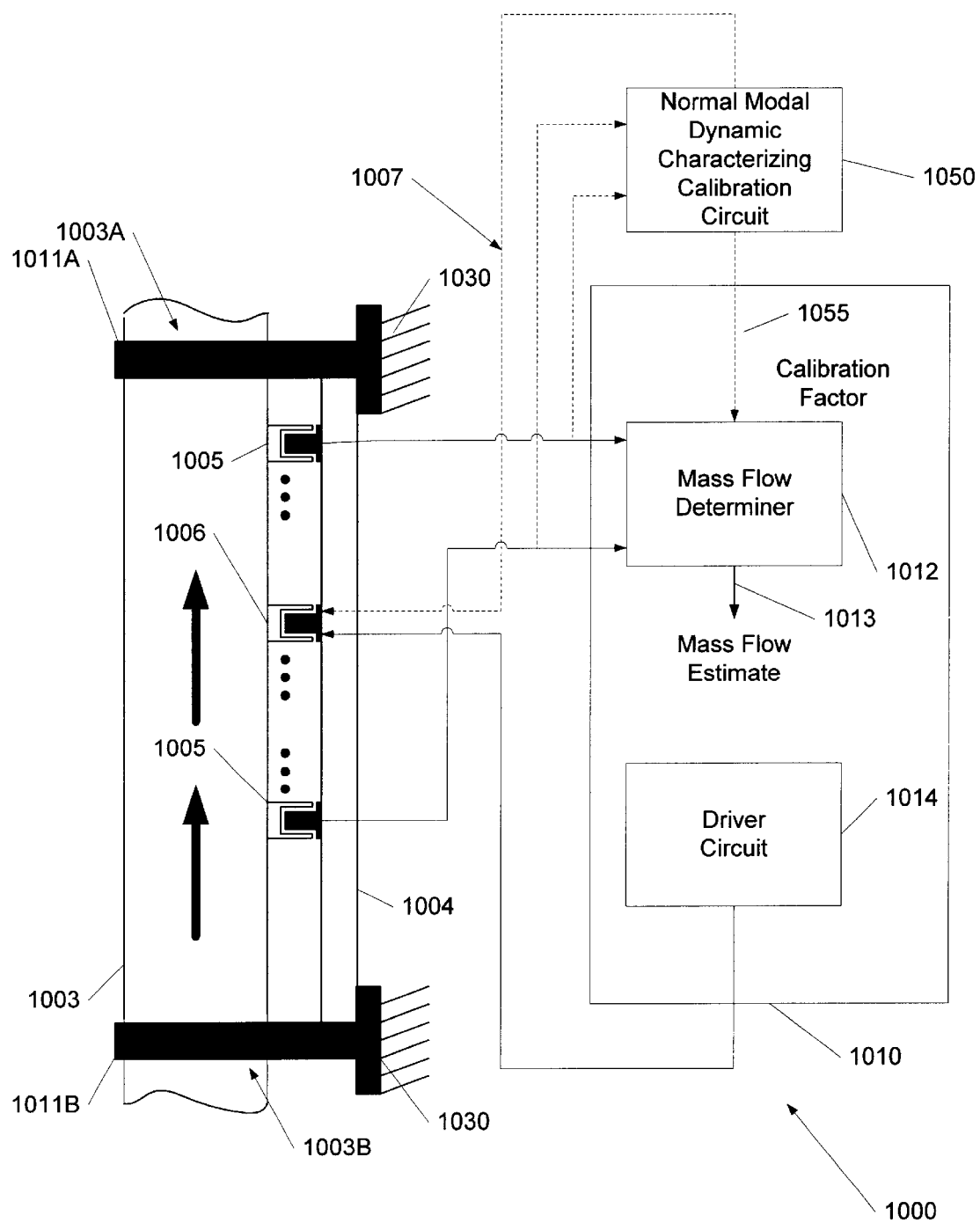

FIG. 10 illustrates another example of a clamp-on flow sensor configuration 1000 according to embodiments of the present invention. A pipeline 1003 is clamped to a rigid structure 1030 at first and second locations 1003A, 1003B by first and second pipeline clamps 1011A, 1011B. The clamps 1011A, 1011B are also attached to a rigid structure 1004, such as a rigid beam. A plurality of relative motion transducers 1005 are configured to engage the pipeline 1003 at respective locations, and provide motion signals 1007 representative of motion of the conduit 1003 relative to the structure 1004. A sensor interface circuit 1010 includes a mass flow determiner circuit 1012 that is operative to process the motion signals 1007 according to calibration factor 1055 derived from a normal modal dynamic characterization of motion of the pipeline 1003 and to generate a mass flow estimate 1013 therefrom. One or more actuators 1006 are also configured to engage the pipeline 1003, and to drive the conduit 1003 relative to the structure 1004 responsive to a driver circuit 1014 included in the sensor interface circuit 1010.

The calibration factor 1055 is generated by a normal modal dynamic characterizing calibration circuit 1050. The calibration circuit 1050 derives the calibration factor 1055 from a normal modal dynamic characterization of motion of the conduit 1003. As shown by the dashed line connections, the calibration circuit 1050 may be operative to receive motion signals 1007 generated by the transducers 1005 and/or to generate drive signals to drive the one or more transducers 1006. This capability may be used, for example, in determining mode shape functions and terms of a modal differential equation of motion, and other parameters needed for determination of the calibration factor 1055.

The calibration factor 1055 may be derived based on an assumption that the conduit 1003 will be constrained to a predetermined boundary condition, such as a fixed end boundary condition for a first bending mode of the conduit 1003. To approximate such a predetermined boundary condition, the motion of the conduit 1003 is constrained. For example, as shown conceptually in FIG. 8, motion at first and second spaced apart locations 1003A, 1003B of the conduit 1003 may be constrained by the clamps 1011A, 1011B and beam 1004 are attached to a rigid structure 1030. It will be appreciated that such fixation may be achieved in other ways.

The sensor interface circuit 1010 may be implemented in a number of different ways. For example, the sensor interface circuit 1010 may be implemented in an electronics package configured to be positioned near the actuators 1005 and the driver 1006. Alternatively, all or portions of the sensor interface circuit 1010 may be positioned away from the transducers 1005 and the one or more actuators 1006. For example, all or portions of the sensor interface circuit 1010 may be included in remote process control equipment connected to the one or more actuators 1006 and/or the motion transducers 1005 via communications links.

It will be further appreciated that the calibration circuit 1050 may be implemented in a number of different ways. For example, all or portions of the calibration circuit 1050 may be integrated with the sensor interface circuit 1010. All or portions of the calibration circuit 1050 may be included, for example, in process control or other equipment. All or portions of the calibration circuit 1050 may also be provided, for example, in test equipment (field or factory) that is connected to the actuators 1006 and transducers 1005 for calibration purposes, but removed or deactivated for normal operation. The sensor interface circuit 1010 may also share components, such as signal processing circuits and driver circuits, with the calibration circuit 1050.

According to other embodiments of the present invention, predetermined boundary conditions for a flow sensor conduit may also be approximated by using mode shape control techniques that constrain motion of a conduit of a mass flow sensor. Such mode shape control techniques are described, for example, in U.S. patent application Ser. No. 09/942,189, entitled "Sensor Apparatus, Methods and Computer Program Products Employing Vibrational Shape Control," to Wheeler, filed concurrently herewith and incorporated herein by reference in its entirety. In particular, the aforementioned application describes how actuators in operative association with a flow sensor conduit may be used to approximate a fixed boundary condition for at least one vibrational mode of the conduit, for example, a first bending mode for a straight-tube type conduit sensor.

Figure 11:
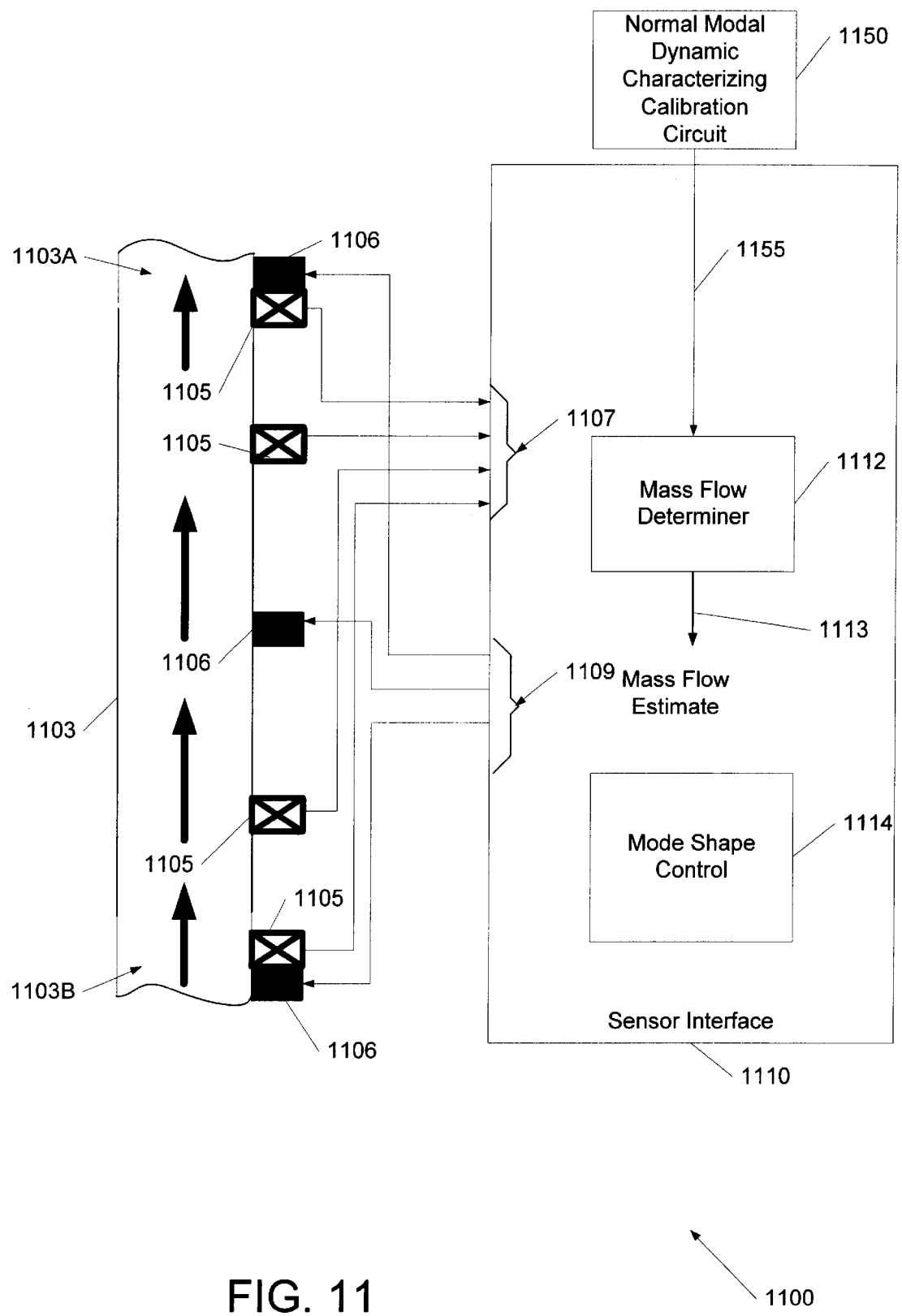

FIG. 11 illustrates a mass flow sensor apparatus 1100 using such mode shape control according to embodiments of the present invention. The apparatus 1100 includes a conduit 1103. A plurality of actuators 1106 are operative to apply force to the conduit at a plurality of locations. A plurality of motion transducers 1105 are also operatively associated with the conduit 1103 and generate motion signals 1107 responsive to motion of the conduit 1103.

Two or more of the motion signals 1107 may be processed by a mass flow determiner circuit 1112 of a sensor interface circuit 1110 to generate a mass flow estimate 1113 using a calibration factor 1155 derived from a normal modal dynamic characterization of motion of the conduit 1103 based on an assumption of a predetermined boundary condition for a mode (e.g., a first bending mode) of the conduit 1103. For example, the assumed predetermined boundary condition may comprise a substantial lack of motion (e.g., in an inertial frame) at the locations 1103A, 1103B of the conduit 1103.

The sensor interface circuit 1110, further includes a mode shape control circuit 1114 that is operative to receive some or all of the motion signals 1107 and to generate the drive signals 1109 responsive thereto. For example, the mode shape control circuit 1120 may be operative to vibrate the conduit 1103 in a first bending while constraining motion of the conduit 1103 such that the predetermined boundary condition upon which the calibration factor 1155 is based is approximated. For example, the mode shape control circuit 1120 may drive the actuators 1106 such that a first bending mode of the conduit 1103 is driven while maintaining substantially zero motion in the first bending mode at the conduit locations 1103A, 1103B.

The calibration factor 1155 is generated by a normal modal dynamic characterizing calibration circuit 1150. The calibration circuit 1150 may be operative to receive motion signals 1107 generated by the transducers 1105 and/or to generate drive signals to drive the one or more transducers 1106 (connections are not shown in FIG. 11 for purposes of clarity of explanation). This capability may be used, for example, in determining mode shape functions and terms of a modal differential equation of motion, and other parameters needed for determination of the calibration factor 1155.

The sensor interface circuit 1110 may be implemented in a number of different ways. For example, the sensor interface circuit 1110 may be implemented in an electronics package configured to be positioned near the actuators 1105 and the drivers 1106. Alternatively, all or portions of the sensor interface circuit 1110 may be positioned away from the transducers 1105 and the one or more actuators 1106. For example, example, all or portions of the sensor interface circuit 1110 may be included in remote process control equipment connected to the actuators 1006 and/or the motion transducers 1105 via communications links.

It will be further appreciated that the calibration circuit 1150 may be implemented in a number of different ways. For example, all or portions of the calibration circuit 1150 may be integrated with the sensor interface circuit 1110. All or portions of the calibration circuit 1150 may be included, for example, in process control or other equipment located distant from the conduit 1103. All or portions of the calibration circuit 1150 may also be provided, for example, in test equipment (field or factory) that is connected to the actuators 1106 and transducers 1105 for calibration purposes, but removed or deactivated for normal operation. The sensor interface circuit 1110 may also share components, such as signal processing circuits and driver circuits, with the calibration circuit 1150.

It will be further understood that, similar to the configurations described above with reference to FIGS. 8–10, the active vibration control approach described above with reference to FIG. 11 may be used to implement straight-tube flow sensors, including integrated and clamp-on configurations.

Figure 12:
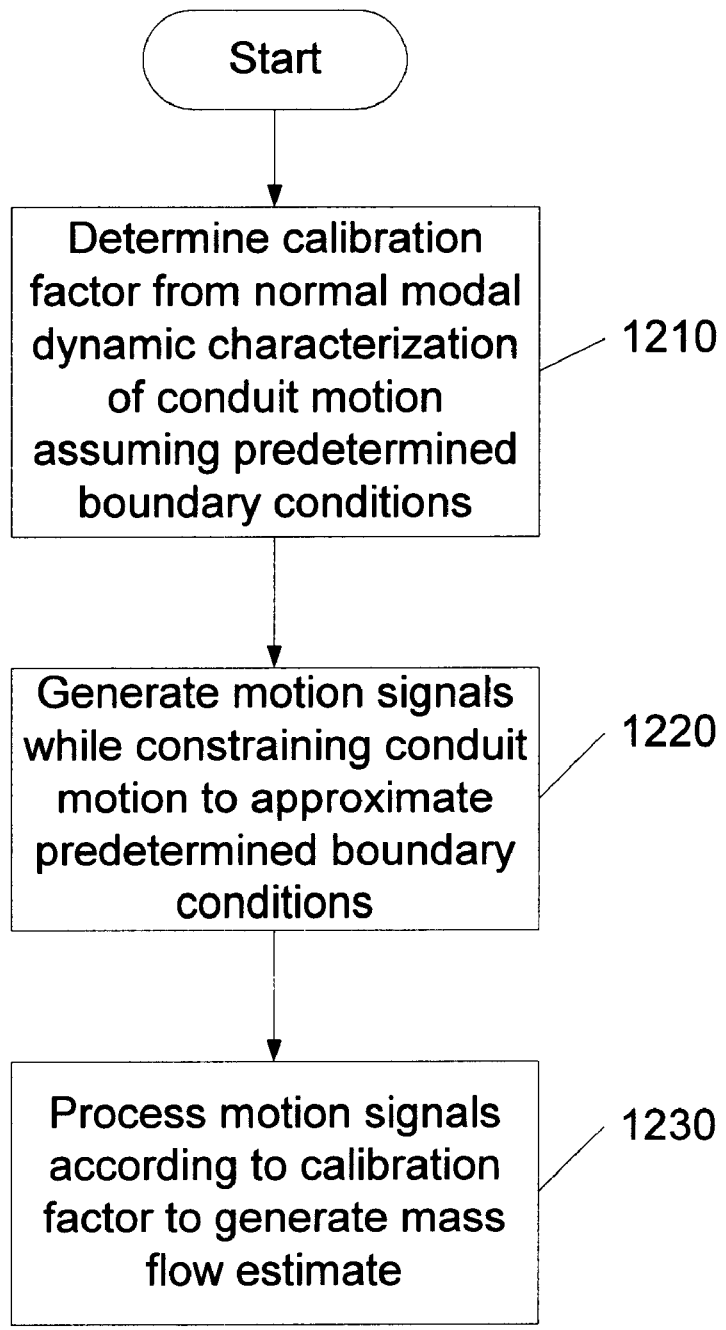
FIG. 12 is a flowchart illustrating exemplary operations for estimating mass flow according to embodiments of the present invention.

FIG. 12 illustrates exemplary operations 1200 according to yet other aspects of the present invention. A calibration factor for a mass flow sensor is determined from a normal modal dynamic characterization of the sensor's conduit assuming a predetermined boundary condition, such as a fixed end boundary condition for one or more normal modes of the conduit (Block 1210). Motion signals representing motion of the conduit are generated while constraining motion of the conduit to approximate the predetermined boundary condition, e.g., by attaching appropriate locations of the conduit to a rigid structure and/or by using shape control (Block 1220). The motion signals so generated are processed according to the calibration factor to generate a mass flow estimate (Block 1230).

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A method of characterizing a parameter sensor comprising a conduit configured to contain a material and a plurality of motion transducers operative to generate motion signals representing motion of the conduit, the method comprising:

determining a flow calibration factor for processing motion signals produced by the plurality of motion transducers from a normal modal dynamic characterization of motion of the conduit.

2. A method according to claim 1, wherein determining a calibration factor comprises:

generating a solution to a modal differential equation of motion in a modal domain comprising a plurality of normal modes of motion of the conduit; and generating the calibration factor from the generated solution of the modal differential equation of motion.

3. A method according to claim 1, further comprising processing a plurality of motion signals produced by the plurality of motion transducers according to the calibration factor to produce a mass flow estimate.

4. A method according to claim 1, wherein determining a calibration factor comprises generating the calibration factor from motion signals produced by the plurality of motion transducers.

5. A method according to claim 1, wherein the calibration factor relates mass flow rate to a spatio-temporal relationship among the plurality of motion signals.

6. A method according to claim 5, wherein the calibration factor relates mass flow rate to one of a time difference or a phase relationship.

7. A method according to claim 1, wherein determining a calibration factor comprises:
generating an estimated spatial response for a plurality of locations of the conduit from the normal modal dynamic characterization; and
generating the calibration factor from the estimated spatial response.

8. A method according to claim 7, wherein generating the calibration factor from the estimated spatial response comprises:
determining a spatio-temporal relationship among movements at the plurality of locations; and
determining the calibration factor from the determined spatio-temporal relationship.

9. A method according to claim 8:
wherein determining a spatio-temporal relationship among movements at the plurality of locations comprises determining one of a time difference or a phase relationship; and
wherein determining the calibration factor from the determined spatio-temporal relationship comprises determining the calibration factor from the determined one of a time difference or a phase relationship.

10. A method according to claim 1, wherein the normal modal dynamic characterization characterizes motion of the conduit as a function of a modal Coriolis term that describes coupling among a plurality of normal modes of the conduit responsive to mass flow in the conduit.

11. A method according to claim 10, wherein determining a calibration factor is preceded by determining the modal Coriolis term from a mode shape function that describes motion of the conduit in a normal mode as a function of location on the conduit.

12. A method according to claim 11, wherein determining a calibration factor is preceded by determining an orthogonality of a mode shape function for a predetermined mass flow in the conduit, the mode shape function describing motion of the conduit in a normal mode as a function of location on the conduit.

13. A method according to claim 12, wherein the mode shape function is a function of an eigenvalue and a boundary condition.

14. A method according to claim 12, further comprising determining the mode shape function.

15. A method according to claim 14, wherein determining the mode shape function comprises determining the mode shape function from a predetermined eigenvalue and a predetermined boundary condition.

16. A method according to claim 15, wherein determining the mode shape function from a predetermined eigenvalue and a predetermined boundary condition comprises assuming a homogenous boundary condition.

17. A method according to claim 10, wherein determining a calibration factor is preceded by determining the modal Coriolis term from a spatial Coriolis characterization that describes motion of a plurality of discrete locations of the conduit in a spatial domain in response to a predetermined mass flow.

18. A method according to claim 17, wherein determining the modal Coriolis term from a spatial Coriolis characterization that describes motion of a plurality of discrete locations of the conduit in a spatial domain in response to a predetermined mass flow comprises determining the modal Coriolis term from the spatial Coriolis characterization using a transformation that relates the spatial domain to the plurality of normal modes.

19. A method according to claim 18, wherein the plurality of motion transducers are operative to generate respective motion signals that represent motion at respective transducer locations of the conduit, wherein the plurality of discrete locations associated with the spatial Coriolis characterization includes locations other than the transducer locations, and wherein determining the modal Coriolis term from the spatial Coriolis characterization using a transformation that relates the spatial domain to the plurality of normal modes comprises:
determining a transformation that relates the spatial domain to the plurality of normal modes for the plurality of discrete locations; and
determining the modal Coriolis term from the spatial Coriolis characterization according to the determined transformation that relates the spatial domain to the plurality of normal modes for the plurality of discrete locations.

20. A method according to claim 19, wherein determining a transformation that relates the spatial domain to the plurality of normal modes for the plurality discrete locations comprises determining the transformation that relates the spatial domain to the plurality of normal modes at the plurality of discrete locations from a mode shape function that describes motion of the conduit in a normal mode as a function of location on the conduit.

21. A method according to claim 20, wherein the mode shape function is a function of an eigenvalue and a boundary condition.

22. A method according to claim 20, further comprising determining the mode shape function.

23. A method according to claim 22, wherein determining the mode shape function comprises determining the mode shape function from a predetermined eigenvalue and a predetermined boundary condition.

24. A method according to claim 23, wherein determining the mode shape function from a predetermined eigenvalue and a predetermined boundary condition comprises assuming a homogenous boundary condition.

25. A method of determining mass flow in a conduit configured to contain a material, the method comprising:
determining a flow calibration factor from a normal modal dynamic characterization of motion of the conduit;
generating a plurality of motion signals representing motion of the conduit at a plurality of locations on the conduit; and
processing the motion signals according to the determined flow calibration factor to produce a mass flow estimate.

26. A method according to claim 25, wherein determining a calibration factor comprises:
  generating a solution of a modal differential equation of motion in a modal domain comprising a plurality normal modes of motion of the conduit; and
  generating the calibration factor from the generated solution of the modal differential equation of motion.

27. A method according to claim 25, wherein processing the motion signals according to the calibration factor comprises:
  determining a spatio-temporal relationship among the plurality of motion signals; and
  applying the calibration factor to the determined spatio-temporal relationship to generate a mass flow estimate.

28. A method according to claim 27:
  wherein determining a spatio-temporal relationship comprises determining one of a time difference or a phase relationship; and
  wherein applying the calibration factor to the determined spatio-temporal relationship comprises applying the calibration factor to the determined one of a time difference or a phase relationship to generate an estimate of mass flow rate.

29. A method according to claim 25, wherein the normal modal dynamic characterization includes a modal Coriolis term that describes coupling among a plurality of normal modes of the conduit responsive to mass flow in the conduit.

30. A method according to claim 29, wherein deriving a calibration factor comprises determining the calibration factor from a mode shape function that describes motion of the conduit in a normal mode as a function of location on the conduit.

31. A method according to claim 30, wherein the mode shape function is based on an assumed boundary condition for the conduit, and wherein the method further comprises constraining motion of the conduit to induce a boundary condition that approximates the assumed boundary condition.

32. A method according to claim 31, wherein constraining motion of the conduit comprises attaching the conduit to a structure.

33. A method according to claim 31, wherein constraining motion of the conduit comprises applying a force to the conduit responsive to motion of the conduit to thereby induce a boundary condition that approximates the assumed boundary condition.

34. An apparatus for calibrating a parameter sensor comprising a conduit configured to contain a material, a plurality of motion transducers operative to generate motion signals representing motion of the conduit and a mass flow estimator circuit operative to estimate mass flow from the motion signals according to a flow calibration factor, the apparatus comprising:
  a flow calibration factor generator circuit operative to generate a calibration factor from a normal modal dynamic characterization of motion of the conduit, the flow calibration factor generator circuit including an interface circuit operative to convey the generated flow calibration factor to the mass flow estimator circuit.

35. An apparatus according to claim 34, wherein the calibration factor generator circuit is configured to receive motion signals from the plurality of motion transducers of the parameter sensor and operative to generate the calibration factor from the received motion signals.

36. An apparatus according to claim 34, wherein the mass flow estimator circuit and at least a portion of the calibration factor generator circuit are co-located.

37. An apparatus according to claim 34, wherein the interface circuit is configured to be coupled and uncoupled to and from the mass flow estimator circuit.

38. An apparatus according to claim 34, wherein the calibration factor generator circuit comprises a data processor circuit.

39. An apparatus according to claim 34, wherein the mass flow estimator circuit and the calibration factor generator circuit are implemented in a common data processor circuit.

40. An apparatus according to claim 34, wherein the calibration factor generator circuit comprises:
  a normal modal dynamic characterizer circuit operative to generate a normal modal dynamic characterization of motion of the conduit; and
  a calibration factor determiner circuit operative to generate the calibration factor from the normal modal characterization.

41. An apparatus according to claim 40, wherein the normal modal characterization comprises a representation of a modal differential equation of motion in a modal domain comprising a plurality of normal modes of motion of the conduit, and wherein the calibration factor determiner circuit is operative to generate a solution of the modal differential equation of motion from the representation of the modal differential equation of motion and to generate the calibration factor from the solution of the modal differential equation of motion.

42. An apparatus according to claim 34, wherein the calibration factor relates mass flow rate to a spatio-temporal relationship among motion signals produced by the plurality of motion transducers.

43. An apparatus according to claim 42, wherein the calibration factor relates mass flow rate to one of a time difference or a phase relationship.

44. An apparatus according to claim 34, wherein the calibration factor generator circuit is operative to generate an estimated spatial response for a plurality of locations of the conduit from the normal modal dynamic characterization and to generate the calibration factor from the estimated spatial response.

45. An apparatus according to claim 44, wherein the calibration factor generator circuit is operative to determine a spatio-temporal relationship among movements at the plurality of locations and to determine the calibration factor from the determined spatio-temporal relationship.

46. An apparatus according to claim 45, wherein the calibration factor generator circuit is operative to determine one of a time difference or a phase relationship and to determine the calibration factor from the determined one of a time difference or a phase relationship.

47. An apparatus according to claim 34, wherein the normal modal dynamic characterization characterizes motion of the conduit as a function of a modal Coriolis term that describes coupling among a plurality of normal modes of the conduit responsive to mass flow in the conduit.

48. An apparatus according to claim 47, wherein the calibration factor generator circuit is operative to determine the modal Coriolis term from a mode shape function that describes motion of the conduit in a normal mode as a function of location on the conduit.

49. An apparatus according to claim 47, wherein the calibration factor generator circuit is operative to determine the modal Coriolis term from a spatial Coriolis characterization that describes motion of a plurality of discrete locations of the conduit in a spatial domain in response to a predetermined mass flow.

50. An apparatus according to claim 49, wherein the calibration factor generator circuit is operative to determine the modal Coriolis term from the spatial Coriolis characterization using a transformation that relates the spatial domain to the plurality of normal modes.

51. An apparatus according to claim 50, wherein the plurality of motion transducers are operative to generate respective motion signals that represent motion at respective transducer locations of the conduit, wherein the plurality of discrete locations associated with the spatial Coriolis characterization includes locations other than the transducer locations, and wherein the calibration factor generator circuit is operative to determine a transformation that relates the spatial domain to the plurality of normal modes for the plurality of discrete locations and to determine the modal Coriolis term from the spatial Coriolis characterization according to the determined transformation that relates the spatial domain to the plurality of normal modes for the plurality of discrete locations.

52. An apparatus according to claim 51, wherein the calibration factor generator circuit is operative to determine the transformation that relates the spatial domain to the plurality of normal modes at the plurality of discrete locations from a mode shape function that describes motion of the conduit in a normal mode as a function of location on the conduit.

53. An apparatus according to claim 52, wherein the mode shape function is a function of an eigenvalue and a boundary condition.

54. An apparatus according to claim 52, wherein the calibration factor generator circuit is further operative to determine the mode shape function.

55. An apparatus according to claim 54, wherein the calibration factor generator circuit is operative to determine the mode shape function from a predetermined eigenvalue and a predetermined boundary condition.

56. An apparatus according to claim 55, wherein the calibration factor generator circuit determines the mode shape function assuming a homogenous boundary condition.

57. An apparatus according to claim 47, wherein the calibration factor generator circuit is operative to determine an orthogonality of a mode shape function for a predetermined mass flow in the conduit, the mode shape function describing motion of the conduit in a normal mode as a function of location on the conduit.

58. An apparatus according to claim 57, wherein the mode shape function is a function of an eigenvalue and a boundary condition.

59. An apparatus according to claim 57, wherein the calibration factor generator circuit is operative to determine the mode shape function.

60. An apparatus according to claim 59, wherein the calibration factor generator circuit is operative to determine the mode shape function from a predetermined eigenvalue and a predetermined boundary condition.

61. An apparatus according to claim 60, wherein the calibration factor generator circuit is operative to determine the mode shape function assuming a homogenous boundary condition.

62. A mass flow sensor, comprising:
a conduit configured to contain a material;
an actuator operative to excite the conduit;
a plurality of motion transducers operative to generate motion signals representing motion of the conduit;
a mass flow estimator circuit configured to receive the motion signals and operative to generate a mass flow estimate therefrom using a flow calibration factor derived from a normal modal characterization of motion of the conduit that assumes a predetermined boundary condition for the conduit; and
means for constraining motion of the conduit to approximate the predetermined boundary condition.

63. A mass flow sensor according to claim 62, further comprising a calibration factor determiner circuit operative to generate the calibration factor responsive to motion signals produced by the plurality of motion transducers.

64. A mass flow sensor according to claim 62, wherein the normal modal dynamic characterization includes a modal Coriolis term that describes coupling among a plurality of normal modes of the conduit responsive to mass flow in the conduit.

65. A mass flow sensor according to claim 62, wherein means for constraining motion of the conduit comprises means for attaching the conduit to a structure.

66. A mass flow sensor according to claim 62, wherein the mass flow estimator circuit is operative to determine a spatio-temporal relationship among the plurality of motion signals and to apply the calibration factor to the determined spatio-temporal relationship to generate a mass flow estimate.

67. A mass flow sensor according to claim 66, wherein the mass flow estimator circuit is operative to determine one of a time difference or a phase relationship and to apply the calibration factor to the determined one of a time difference or a phase relationship to generate an estimate of mass flow rate.

68. A mass flow sensor according to claim 62, wherein the means for constraining motion of the conduit comprises means for applying a force to the conduit responsive to motion of the conduit to thereby induce a boundary condition that approximates the assumed boundary condition.

69. A mass flow sensor according to claim 68, wherein the means for applying a force to the conduit comprises:
at least two motion transducers operative to generate motion signals representing motion of the conduit;
a plurality of actuators operatively associated with the conduit; and
a shape control circuit configured to receive motion signals from at least two motion transducers and operative to drive the plurality of actuators responsively thereto.

70. A mass flow sensor according to claim 62:
wherein the conduit comprises a substantially straight tube configured to convey a material therethrough and attached at first and second spaced apart locations to structure that constrains relative motion of the first and second locations of the tube; and
wherein the plurality of motion transducers are positioned between the first and second locations.

71. A mass flow sensor according to claim 70:
wherein the actuator is operative to excite a first bending mode of the tube; and
wherein the predetermined boundary condition comprises substantially zero motion at the first and second spaced apart locations in the first bending mode.

72. A mass flow sensor according to claim 62:
wherein the conduit comprises a substantially straight tube configured to convey a material therethrough;
wherein the means for constraining motion comprises:
at least two motion transducers operative to generate motion signals representing motion of the tube;
at least three actuators operatively associated with the conduit; and
a shape control circuit configured to receive motion signals from at least two motion transducers and operative to control the at least three actuators responsively thereto.

73. A mass flow sensor according to claim 72, wherein the shape control circuit is operative to control the at least three actuators such that motion of the tube approximates a first bending mode.

74. A mass flow sensor according to claim 73, wherein the shape control circuit is operative to constrain motion of the tube such that first and second spaced apart locations of the tube exhibit approximately no relative motion.

75. A mass flow sensor, comprising:
a substantially straight tube configured to convey a material therethrough;
a plurality of actuators operatively associated with the tube;
a plurality of motion transducers operative to generate motion signals representing motion of the tube;
a mass flow estimator circuit configured to receive at least some of the motion signals and operative to generate a mass flow estimate therefrom using a flow calibration factor derived from a normal modal characterization of motion of the conduit that assumes a predetermined boundary condition for the conduit; and
a shape control circuit configured to receive at least some of the motion signals and operative to control the actuators responsively thereto such that motion of the tube approximately satisfies the predetermined boundary condition.

76. A mass flow sensor according to claim 75, wherein the normal modal dynamic characterization includes a modal Coriolis term that describes coupling among a plurality of normal modes of the conduit responsive to mass flow in the conduit.

77. A mass flow sensor according to claim 75, further comprising a calibration factor determiner circuit operative to generate the calibration factor responsive to motion signals produced by the plurality of motion transducers.

78. A mass flow sensor according to claim 75, wherein the mass flow estimator circuit is operative to determine a spatio-temporal relationship among the plurality of motion signals and to apply the calibration factor to the determined spatio-temporal relationship to generate a mass flow estimate.

79. A mass flow sensor according to claim 78, wherein the mass flow estimator circuit is operative to determine one of a time difference or a phase relationship and to apply the calibration factor to the determined one of a time difference or a phase relationship to generate an estimate of mass flow rate.

80. A mass flow sensor according to claim 75, wherein the shape control circuit is operative to control the plurality of actuators such that motion of the tube approximates a first bending mode.

81. A mass flow sensor according to claim 80, wherein the shape control circuit is operative to constrain motion of the tube such that first and second spaced apart locations of the tube exhibit approximately no relative motion.

82. A computer program product for characterizing a parameter sensor comprising a conduit configured to contain a material and a plurality of motion transducers operative to generate motion signals representing motion of the conduit, the computer program product comprising computer-readable program code embodied in a computer-readable storage medium, the computer-readable program code comprising:
program code for determining a flow calibration factor for processing motion signals produced by the plurality of motion transducers from a normal modal dynamic characterization of motion of the conduit.

83. A computer program product according to claim 82, wherein the program code for determining a calibration factor comprises:
program code for generating a solution to a modal differential equation of motion in a modal domain comprising a plurality of normal modes of motion of the conduit; and
program code for generating the calibration factor from the generated solution of the modal differential equation of motion.

84. A computer program product according to claim 82, wherein the calibration factor relates mass flow rate to a spatio-temporal relationship among the plurality of motion signals.

85. A computer program product according to claim 84, wherein the calibration factor relates mass flow rate to one of a time difference or a phase relationship.

86. A computer program product according to claim 82, wherein the program code for determining a calibration factor comprises:
program code for generating an estimated spatial response for a plurality of locations of the conduit from the normal modal dynamic characterization; and
program code for generating the calibration factor from the estimated spatial response.

87. A computer program product according to claim 86, wherein the program code for generating the calibration factor from the estimated spatial response comprises:
program code for determining a spatio-temporal relationship among movements at the plurality of locations; and
program code for determining the calibration factor from the determined spatio-temporal relationship.

88. A computer program product according to claim 87:
wherein the program code for determining a spatio-temporal relationship among movements at the plurality of locations comprises program code for determining one of a time difference or a phase relationship; and
wherein the program code for determining the calibration factor from the determined spatio-temporal relationship comprises program code for determining the calibration factor from the determined one of a time difference or a phase 75.

89. A computer program product according to claim 82, wherein the normal modal dynamic characterization characterizes motion of the conduit as a function of a modal Coriolis term that describes coupling among a plurality of normal modes of the conduit responsive to mass flow in the conduit.

90. A computer program product according to claim 89, where the computer readable program code further comprises program code for determining the modal Coriolis term from a mode shape function that describes motion of the conduit in a normal mode as a function of location on the conduit.

91. A computer program product according to claim 89, wherein the computer-readable program code further comprises program code for determining the modal Coriolis term from a spatial Coriolis characterization that describes motion of a plurality of discrete locations of the conduit in a spatial domain in response to a predetermined mass flow.

92. A computer program product according to claim 91, wherein the program code for determining the modal Coriolis term from a spatial Coriolis characterization that describes motion of a plurality of discrete locations of the conduit in a spatial domain in response to a predetermined mass flow comprises program code for determining the modal Coriolis term from the spatial Coriolis characterization using a transformation that relates the spatial domain to the plurality of normal modes.

93. A computer program product according to claim 92, wherein the plurality of motion transducers are operative to generate respective motion signals that represent motion at respective transducer locations of the conduit, wherein the plurality of discrete locations associated with the spatial Coriolis characterization includes locations other than the transducer locations, and wherein the program code for determining the modal Coriolis term from the spatial Coriolis characterization using a transformation that relates the spatial domain to the plurality of normal modes comprises:

program code for determining a transformation that relates the spatial domain to the plurality of normal modes for the plurality of discrete locations; and program code for determining the modal Coriolis term from the spatial Coriolis characterization according to the determined transformation that relates the spatial domain to the plurality of normal modes for the plurality of discrete locations.

94. A computer program product according to claim 93, wherein the program code for determining a transformation that relates the spatial domain to the plurality of normal modes for the plurality discrete locations comprises program code for determining the transformation that relates the spatial domain to the plurality of normal modes at the plurality of discrete locations from a mode shape function that describes motion of the conduit in a normal mode as a function of location on the conduit.

95. A computer program product according to claim 94, wherein the mode shape function is a function of an eigenvalue and a boundary condition.

96. A computer program product according to claim 94, wherein the computer-readable program code further comprises program code for determining the mode shape function.

97. A computer program product according to claim 96, wherein the program code for determining the mode shape function comprises program code for determining the mode shape function from a predetermined eigenvalue and a predetermined boundary condition.

98. A computer program product according to claim 96, wherein the program code for determining the mode shape function from a predetermined eigenvalue and a predetermined boundary condition comprises program code for assuming a homogenous boundary condition.

99. A computer program product according to claim 90, wherein the computer-readable program code further comprises program code for determining an orthogonality of a mode shape function for a predetermined mass flow in the conduit, the mode shape function describing motion of the conduit in a normal mode as a function of location on the conduit.

100. A computer program product according to claim 99, wherein the mode shape function is a function of an eigenvalue and a boundary condition.

101. A computer program product according to claim 99, wherein the computer-readable program code further comprises program code for determining the mode shape function.

102. A computer program product according to claim 101, wherein the program code for determining the mode shape function comprises program code for determining the mode shape function from a predetermined eigenvalue and a predetermined boundary condition.

103. A computer program product according to claim 102, wherein the program code for determining the mode shape function from a predetermined eigenvalue and a predetermined boundary condition comprises program code for assuming a homogenous boundary condition.

* * * * *

UNITED STATES PATENT AND TRADEMARK OFFICE
CERTIFICATE OF CORRECTION

PATENT NO. : 6,678,624 B2
DATED : January 13, 2004
INVENTOR(S) : David F. Normen It is certified that error appears in the above-identified patent and that said Letters Patent is hereby corrected as shown below:

Column 11,
Lines 19-22, replace "integration technique is described in U.S. patent application Ser. No. 09/116,845 to Cunningham et al., filed Jul. 16, 1998 and incorporated herein by reference in its entirety [previously filed case on spatial integration]." with
-- integration technique as described in U.S. Patent No. 6,233,526, incorporated herein by reference in its entirety. --

Column 12,
Lines 28-29, replace
$$-\rho_f A_f \left(\frac{\partial}{\partial t} + v_f \frac{\partial}{\partial x}\right)^2 y - Fc - \bar{\tau c}(\theta + \alpha) = 00 \quad (11)"$$
$$-\rho_f I_f \ddot{\theta} + Mc + PA_f y' = 0$$

with
$$-\rho_f A_f \left(\frac{\partial}{\partial t} + v_f \frac{\partial}{\partial x}\right)^2 y - Fc - \bar{\tau c}(\theta + \alpha) = 0 \quad (11) --$$
$$-\rho_f I_f \ddot{\theta} + Mc + PA_f y' = 0$$

Lines 35-36, replace "1310, $v_j$ is the velocity of the material 1320 in the conduit 1310, $\rho_j I_j$ is the inertia per unit length of the material 1320" with -- 1310, $v_f$ is the velocity of the material 1320 in the conduit 1310, $\rho_f I_f$ is the inertia per unit length of the material 1320 --
Lines 44-47, replace "shear ( ) on the wall of the conduit "beam":

$$V' - \rho_t A_t - d\ddot{y} + \rho_f A_f \left(\frac{\partial}{\partial t} + v_f \frac{\partial}{\partial x}\right)^2 y + F(x,t) = 0 \quad (12)$$

with -- shear ( $\tau$ ) on the wall of the conduit "beam":

$$V' - \rho_t A_t - d\ddot{y} + \rho_f A_f \left(\frac{\partial}{\partial t} + v_f \frac{\partial}{\partial x}\right)^2 y + F(x,t) = 0 \quad (12) --$$

Lines 53-56, replace "$y'(x,t) = \theta(x,t) + \alpha(x,t) V(x,t) = \hat{k}GA\alpha(x,t) M(x,t) = EI_t\theta'(x,t)$ (13) This can be reduced to two equations in terms of y(x,t) and x,t." with
-- $y'(x,t) = \theta(x,t) + \alpha(x,t) V(x,t) = \hat{k}GA_t\alpha(x,t) M(x,t) = EI_t\theta'(x,t)$ (13) This can be reduced to two equations in terms of y(x,t) and θx, t. --

UNITED STATES PATENT AND TRADEMARK OFFICE
CERTIFICATE OF CORRECTION

PATENT NO. : 6,678,624 B2
DATED : January 13, 2004
INVENTOR(S) : David F. Normen It is certified that error appears in the above-identified patent and that said Letters Patent is hereby corrected as shown below:

Column 13,
Lines 1-24, replace $$x = L\underline{x} \quad dx = Ld\underline{x} \tag{15}$$

$$t = \frac{1}{\omega_1}\underline{t} \quad dt = \frac{1}{\omega_1}d\underline{t} \quad \underline{\omega}_r = \frac{\omega_r}{\omega_1} \quad \underline{\omega} = \frac{\omega}{\omega_1}$$

$$\eta_r(t) = e^{j\omega t} = \eta_r(\underline{t}) = e^{j\frac{\omega}{\omega_1}\underline{t}} = e^{j\underline{\omega}\underline{t}}\langle in \rangle \quad \underline{\eta}_r(\underline{t}) = \frac{1}{L}\eta_r(\underline{t})\langle 0 \rangle$$

$$\Phi_r(x) = \Phi_r(\underline{x}) = \underline{\Phi}_r(\underline{x})\langle 0 \rangle$$

$$\Phi_r(x) = \begin{bmatrix} e^{\lambda 1, x} & e^{-\lambda 1, x} & e^{j\lambda 2, x} & e^{-j\lambda 2, x} \end{bmatrix}\{BC_r\}\langle 0 \rangle$$

$$\Phi_r(\underline{x}) = \begin{bmatrix} e^{\lambda 1, L\underline{x}} & e^{-\lambda 1, L\underline{x}} & e^{j\lambda 2, L\underline{x}} & e^{-j\lambda 2, L\underline{x}} \end{bmatrix}\{BC_r\}\langle 0 \rangle$$

$$\underline{\Phi}_r(\underline{x}) = \begin{bmatrix} e^{\lambda 1, L\underline{x}} & e^{-\lambda 1, L\underline{x}} & e^{j\lambda 2, L\underline{x}} & e^{-j\lambda 2, L\underline{x}} \end{bmatrix}\{BC_r\}\langle 0 \rangle$$

$$\Psi_r(x) = \Psi_r(\underline{x}) = \frac{1}{L}\underline{\Psi}_r(\underline{x})\langle 1/in \rangle$$

$$\Psi_r(x) = \begin{bmatrix} e^{\lambda 1, x} & e^{-\lambda 1, x} & e^{j\lambda 2, x} & e^{-j\lambda 2, x} \end{bmatrix}\llbracket u_r \rrbracket\{BC_r\}\langle 1/in \rangle$$

$$\Psi_r(\underline{x}) = \begin{bmatrix} e^{\lambda 1, L\underline{x}} & e^{-\lambda 1, L\underline{x}} & e^{j\lambda 2, L\underline{x}} & e^{-j\lambda 2, L\underline{x}} \end{bmatrix}\llbracket u_r \rrbracket\{BC_r\}\langle 1/in \rangle$$

$$\underline{\Psi}_r(\underline{x}) = \begin{bmatrix} e^{\lambda 1, L\underline{x}} & e^{-\lambda 1, L\underline{x}} & e^{j\lambda 2, L\underline{x}} & e^{-j\lambda 2, L\underline{x}} \end{bmatrix}\llbracket \underline{u}_r \rrbracket\{BC_r\}\langle 0 \rangle$$

$$\llbracket \underline{u}_r \rrbracket = L\llbracket u_r \rrbracket$$

with $$x = L\underline{x} \quad dx = Ld\underline{x} \tag{15}$$

$$t = \frac{1}{\omega_1}\underline{t} \quad dt = \frac{1}{\omega_1}d\underline{t} \quad \underline{\omega}_r = \frac{\omega_r}{\omega_1} \quad \underline{\omega} = \frac{\omega}{\omega_1}$$

$$\eta_r(t) = e^{j\omega t} = \eta_r(\underline{t}) = e^{j\frac{\omega}{\omega_1}\underline{t}} = e^{j\underline{\omega}\underline{t}}\langle in \rangle \quad \underline{\eta}_r(\underline{t}) = \frac{1}{L}\eta_r(\underline{t})\langle 0 \rangle$$

$$\Phi_r(x) = \Phi_r(\underline{x}) = \underline{\Phi}_r(\underline{x})\langle 0 \rangle$$

$$\Phi_r(x) = \begin{bmatrix} e^{\lambda 1, x} & e^{-\lambda 1, x} & e^{j\lambda 2, x} & e^{-j\lambda 2, x} \end{bmatrix}\{BC_r\}\langle 0 \rangle$$

$$\Phi_r(\underline{x}) = \begin{bmatrix} e^{\lambda 1, L\underline{x}} & e^{-\lambda 1, L\underline{x}} & e^{j\lambda 2, L\underline{x}} & e^{-j\lambda 2, L\underline{x}} \end{bmatrix}\{BC_r\}\langle 0 \rangle$$

$$\underline{\Phi}_r(\underline{x}) = \begin{bmatrix} e^{\lambda 1, L\underline{x}} & e^{-\lambda 1, L\underline{x}} & e^{j\lambda 2, L\underline{x}} & e^{-j\lambda 2, L\underline{x}} \end{bmatrix}\{BC_r\}\langle 0 \rangle$$

$$\Psi_r(x) = \Psi_r(\underline{x}) = \frac{1}{L}\underline{\Psi}_r(\underline{x})\langle 1/in \rangle$$

$$\Psi_r(x) = \begin{bmatrix} e^{\lambda 1, x} & e^{-\lambda 1, x} & e^{j\lambda 2, x} & e^{-j\lambda 2, x} \end{bmatrix}\llbracket u_r \rrbracket\{BC_r\}\langle 1/in \rangle$$

$$\Psi_r(\underline{x}) = \begin{bmatrix} e^{\lambda 1, L\underline{x}} & e^{-\lambda 1, L\underline{x}} & e^{j\lambda 2, L\underline{x}} & e^{-j\lambda 2, L\underline{x}} \end{bmatrix}\llbracket u_r \rrbracket\{BC_r\}\langle 1/in \rangle$$

$$\underline{\Psi}_r(\underline{x}) = \begin{bmatrix} e^{\lambda 1, L\underline{x}} & e^{-\lambda 1, L\underline{x}} & e^{j\lambda 2, L\underline{x}} & e^{-j\lambda 2, L\underline{x}} \end{bmatrix}\llbracket \underline{u}_r \rrbracket\{BC_r\}\langle 0 \rangle$$

$$\llbracket \underline{u}_r \rrbracket = L\llbracket u_r \rrbracket$$

UNITED STATES PATENT AND TRADEMARK OFFICE
CERTIFICATE OF CORRECTION

PATENT NO.     : 6,678,624 B2
DATED          : January 13, 2004
INVENTOR(S)    : David F. Normen It is certified that error appears in the above-identified patent and that said Letters Patent is hereby corrected as shown below:

Column 14,
Line 60, replace "$\frac{d\omega_1 L}{EI_t}\Phi_r(x)\frac{\partial \eta_r(t)}{\partial t} - ... \frac{2\rho_f A_f v_f \omega_1}{EI_t}\frac{\partial \Phi_r(x)}{\partial x}\frac{\partial \eta_r(t)}{\partial t} - $"

with $-\frac{d\omega_1 L}{EI_t}\underline{\Phi_r}(x)\frac{\partial \underline{\eta_r}(t)}{\partial t} - \frac{2\rho_f A_f v_f \omega_1}{EI_t}\frac{\partial \underline{\Phi_r}(x)}{\partial x}\frac{\partial \underline{\eta_r}(t)}{\partial t} - -$ Column 15,
Line 3, replace "$\frac{\hat{k}GA_t}{EI_t}\left(\frac{\partial \Phi_r(x)}{\partial x} - \Psi_r(x)\right)\eta_r(t) - ... \frac{\rho I \omega_1^2}{EI_t}\Psi_r(x)\frac{\partial \eta_r(t)}{\partial t^2} = 0$"

with $-\frac{\hat{k}GA_t}{EI_t}\left(\frac{\partial \underline{\Phi_r}(x)}{\partial x} - \underline{\Psi_r}(x)\right)\underline{\eta_r}(t) - \frac{\rho I \omega_1^2}{EI_t}\underline{\Psi_r}(x)\frac{\partial^2 \underline{\eta_r}(t)}{\partial t^2} = 0$ --

Line 12, replace "$\frac{d\omega_1 L^4}{EI_t}\frac{1}{L}\Phi_r(x)\frac{\partial \eta_r(t)}{\partial t} - ... \frac{2\rho_f A_f v_f \omega_1 L^3}{EI_t}\frac{1}{L}\frac{\partial \Phi_r(x)}{\partial x}\frac{\partial \eta_r(t)}{\partial t} - $"

with $-\frac{d\omega_1 L^4}{EI_t}\frac{1}{L}\underline{\Phi_r}(x)\frac{\partial \underline{\eta_r}(t)}{\partial t} - \frac{2\rho_f A_f v_f \omega_1 L^3}{EI_t}\frac{1}{L}\frac{\partial \underline{\Phi_r}(x)}{\partial x}\frac{\partial \underline{\eta_r}(t)}{\partial t} - -$ Lines 20-23, replace "$\left(\frac{1}{L}\frac{\partial \Phi_r(x)}{\partial(x)} - \frac{1}{L}\Psi_r(x)\right)\eta_r(t) - ... \frac{\rho I \omega_1^2 L^2}{EI_t}\frac{1}{L}\Psi_r(x)\frac{\partial^2 \eta_r(t)}{\partial t^2} = 0$ In equation (19), S is positive for tension, therefore S is" with $-\left(\frac{1}{L}\frac{\partial \underline{\Phi_r}(x)}{\partial(x)} - \frac{1}{L}\underline{\Psi_r}(x)\right)\underline{\eta_r}(t) - \frac{\rho I \omega_1^2 L^2}{EI_t}\frac{1}{L}\underline{\Psi_r}(x)\frac{\partial^2 \underline{\eta_r}(t)}{\partial t^2} = 0$ In equaiton (19), S is positive for tension, therefore $\underline{S}$ is --

Column 16,
Line 9, replace "$-L\int_{x_t}^{x_t}\begin{Bmatrix}\Phi_m(x)\\\Psi_m(x)\end{Bmatrix}^T\begin{bmatrix}d+2\dot{m}\frac{d}{\partial x} & 0\\ 0 & 0\end{bmatrix}\begin{Bmatrix}\frac{1}{L}\Phi_R(x)\\\frac{1}{L}\Psi_r(x)\end{Bmatrix}dx\frac{\partial \eta_r(t)}{\partial t} + $" with $-L\int_{x_t}^{x_t}\begin{Bmatrix}\underline{\Phi_m}(x)\\\underline{\Psi_m}(x)\end{Bmatrix}^T\begin{bmatrix}d+2\dot{m}\frac{d}{\partial x} & 0\\ 0 & 0\end{bmatrix}\begin{Bmatrix}\frac{1}{L}\underline{\Phi_R}(x)\\\frac{1}{L}\underline{\Psi_r}(x)\end{Bmatrix}d\underline{x}\frac{\partial \underline{\eta_r}(t)}{\partial t} + -$ Line 32, delete "..." from the beginning of the equation on line 32

Lines 62-63, replace "$[mr]\{\ddot{\eta}(t)\} + [dr+cr]\{\dot{\eta}(t)\} + [kr]\{\eta(t)\} = \{N_r\}$        (28)

The modal response $\{\eta(t)\}$ may be considered to be" with $-[\underline{mr}]\{\underline{\ddot{\eta}}(t)\} + [\underline{dr}+\underline{cr}]\{\underline{\dot{\eta}}(t)\} + [\underline{kr}]\{\underline{\eta}(t)\} = \{\underline{N_r}\}$        (28)

The modal response $\{\underline{\eta}(t)\}$ may be considered to be --

Line 67, replace "$(-\omega^2[mr] + j\omega[dr+cr] + [kr])\{\eta(t)\} = \{N\}$        (29)"

with $-(-\underline{\omega}^2[\underline{mr}] + j\underline{\omega}[\underline{dr}+\underline{cr}] + [\underline{kr}])\{\underline{\eta}(t)\} = \{\underline{N}\}$        (29) --

UNITED STATES PATENT AND TRADEMARK OFFICE
CERTIFICATE OF CORRECTION

PATENT NO. : 6,678,624 B2
DATED : January 13, 2004
INVENTOR(S) : David F. Normen It is certified that error appears in the above-identified patent and that said Letters Patent is hereby corrected as shown below:

Column 17,
Lines 14-17, replace $-\{\eta(t)\} = (-\omega^2[mr] + j\omega[dr+cr] + [kr])^{-1}\{N\}$ (30) At this point, a simplifying assumption may be made that the beam acts like a Euler/Bernoulli beam, i.e. $\rho I \approx A \approx S \approx 0$, with $-\{\underline{\eta(t)}\} = (-\underline{\omega}^2[\underline{mr}] + j\underline{\omega}[\underline{dr}+\underline{cr}] + [\underline{kr}])^{-1}\{\underline{N}\}$ (30)

At this point, a simplifying assumption may be made that the beam acts like a Euler/Bernoulli beam, i.e. $\underline{\rho I} \approx \underline{A} \approx \underline{S} \approx 0$ –

Line 33, replace $-\{\eta(t)\} = (-\omega^2 \rho A[\hat{m}r] + j\omega(d[\hat{d}r] + \dot{m}[\hat{c}r]) + [\hat{k}r])^{-1}\{N\}$ (32) · with $-\{\underline{\eta(t)}\} = (-\underline{\omega}^2 \underline{\rho A}[\hat{m}r] + j\underline{\omega}(\underline{d}[\hat{d}r] + \underline{\dot{m}}[\hat{c}r]) + [\hat{k}r])^{-1}\{\underline{N}\}$ (32) –

Lines 43-62, replace "damping, Coriolis and stiffness matrices $[\hat{m}r], [\hat{d}r], [\hat{c}r], and [\hat{k}r]$ can be assumed to be constant. Assuming the modal excitation doesn't change, the only variables in equation (32) that change are $\rho A, d, and \dot{m}$. It may also be assumed that ) $\omega=1$, as the firs bending mode is typically driven in a straight-tube Coriolis meter. Theoretically, mass flow can be measured in modal domain because $\{\eta(t)\}$ is complex with flow:

$$\rho A = ((\rho_t A_t + \rho_f A_f)L)\omega_1^2 \frac{L^3}{EI_t} \quad (33)$$

$$\dot{m} = \frac{\rho_1 A_1 v_1^2}{EI_t}$$

where $$(\rho_t A_t + \rho_f A_f)L\left(\frac{lbf \sec^2}{in}\right) \cdot$$

with -- damping, Coriolis and stiffness matrices $[\hat{m}r], [\hat{d}r], [\hat{c}r], and [\hat{k}r]$ can be assumed to be constant. Assuming the modal excitation doesn't change, the only variables in equation (32) that change are $\underline{\rho A, d, and \dot{m}}$. It may also be assumed that $\omega=1$, as the first bending mode is typically driven in a straight-tube Coriolis meter. Theoretically, mass flow can be measured in modal domain because $\{\underline{\eta(t)}\}$ is complex with flow:

$$\underline{\rho A} = ((\rho_t A_t + \rho_f A_f)L)\omega_1^2 \frac{L^3}{EI_t} \quad (33)$$

$$\underline{\dot{m}} = \frac{\rho_f A_f v_f^2}{EI_t}$$

where $$(\rho_t A_t + \rho_f A_f)L\left(\frac{lbf \sec^2}{in}\right)$$

UNITED STATES PATENT AND TRADEMARK OFFICE
CERTIFICATE OF CORRECTION

PATENT NO.     : 6,678,624 B2    Page 5 of 6
DATED          : January 13, 2004
INVENTOR(S)    : David F. Normen It is certified that error appears in the above-identified patent and that said Letters Patent is hereby corrected as shown below:

Column 18,
Line 11, replace 
$$\{\eta(t)\} = \frac{EI_t}{((\rho A)L)L^3}\left(-\omega^2[\hat{m}r] + 2j\zeta\dot{\Gamma}\omega_{r,1}\omega[\hat{d}r] + 2j\frac{(\rho_f A_f v_f)}{((\rho A)L)L^3}[\hat{c}r] + \frac{EI_t}{((\rho A)L)L^3}[\hat{k}r]\right)^{-1}\{N\} \quad (34)$$
with
$$\{\underline{\eta}(t)\} = \frac{EI_t}{((\rho A)L)L^3}\left(-\omega^2[\underline{\hat{m}r}] + 2j\zeta\dot{\Gamma}\omega_{r,1}\omega[\underline{\hat{d}r}] + 2j\frac{(\rho_f A_f v_f)}{((\rho A)L)L^3}[\underline{\hat{c}r}] + \frac{EI_t}{((\rho A)L)L^3}[\underline{\hat{k}r}]\right)^{-1}\{\underline{N}\} \quad (34)$$

Line 17, replace "remaining variable in equation (34) are $EI_t, \rho_1 A_1 v_1, \omega,$ and" with
-- remaining variable in equation (34) are $\underline{EI_t, \rho_f A_f v_f, \omega}$ and --

Lines 24-25, replace "modal mass, damping, Coriolis and stiffness matrices $[\hat{m}r], [\hat{d}r], [\hat{c}r], and [\hat{k}r]$ can be assumed to be constant. So the" with -- modal mass, damping, Coriolis and stiffness matrices $[\underline{\hat{m}r}], [\underline{\hat{d}r}], [\underline{\hat{c}r}], and [\underline{\hat{k}r}]$ can be assumed to be constant. So the --

Line 33, replace 
$$\{y(x,t)\}_p = [\Phi_r(x_p)]_{Pr} L\{\eta(t)\}_r \quad (35)$$
with
$$\{y(\underline{x},t)\}_p = [\Phi_r(\underline{x_p})]_{p,r} L\{\underline{\eta}(t)\}_r \quad (35)$$

Column 19,
Line 10, replace 
$$\det\begin{bmatrix}(A-B)\lambda_r^2 - \rho A\omega^2 & B\lambda_r \\ -(S+B)\lambda_r & B-\lambda_r^2-\rho I\omega^2\end{bmatrix} = 0 \quad (38)$$
with
$$\det\begin{bmatrix}(\underline{A}-\underline{B})\lambda_r^2 - \rho A\omega^2 & \underline{B}\lambda_r \\ -(\underline{S}+\underline{B})\lambda_r & \underline{B}-\lambda_r^2-\underline{\rho I}\omega^2\end{bmatrix} = 0 \quad (38)$$

Line 38, replace "solve for ρA, S, ρI, and B:" with -- solve for $\underline{\rho A}, \underline{S}, \underline{\rho I},$ and $\underline{B}$: --

Column 20,
Line 5, replace 
$$\begin{bmatrix}\ddot{mr}\end{bmatrix}_{measured} = \rho A[\hat{m}r_\Phi] + \rho I[\hat{m}r_\Psi] \quad (42)$$
with
$$\begin{bmatrix}\underline{\ddot{mr}}\end{bmatrix}_{measured} = \rho A[\underline{\hat{m}r_\Phi}] + \rho I[\underline{\hat{m}r_\Psi}] \quad (42)$$

Line 15, replace 
$$\begin{Bmatrix}\rho A\\\rho I\end{Bmatrix} = \begin{bmatrix}\{\hat{m}r_\Phi\}_{:,1} & \{\hat{m}r_\Psi\}_{:,1}\\ \vdots & \vdots \\ \{\hat{m}r_\Phi\}_{:,r} & \{\hat{m}r_\Psi\}_{:,r}\end{bmatrix}\begin{Bmatrix}\{mr_{measured}\}_{:,1}\\ \vdots \\ \{mr_{measured}\}_{:,r}\end{Bmatrix} \quad (43)$$
with
$$\begin{Bmatrix}\rho A\\\rho I\end{Bmatrix} = \begin{bmatrix}\{\underline{\hat{m}r_\Phi}\}_{:,1} & \{\underline{\hat{m}r_\Psi}\}_{:,1}\\ \vdots & \vdots \\ \{\underline{\hat{m}r_\Phi}\}_{:,r} & \{\underline{\hat{m}r_\Psi}\}_{:,r}\end{bmatrix}^*\begin{Bmatrix}\{mr_{measured}\}_{:,1}\\ \vdots \\ \{mr_{measured}\}_{:,r}\end{Bmatrix} \quad (43)$$

Line 25, replace "ρI can be measured and used to calculate $EI_t$ and $\hat{k}GA$." with -- ρI can be measured and used to calculate $\underline{EI_t}$ and $\underline{\hat{k}GA_t}$. --

UNITED STATES PATENT AND TRADEMARK OFFICE
CERTIFICATE OF CORRECTION

PATENT NO. : 6,678,624 B2
DATED : January 13, 2004
INVENTOR(S) : David F. Normen It is certified that error appears in the above-identified patent and that said Letters Patent is hereby corrected as shown below:

Column 23,
Line 16, replace "e.g., the $[\hat{mr}] \text{ and } [\hat{kr}]$ krimatrices of equation (34), are" with -- e.g., the $[\hat{mr}] \text{ and } [\hat{kr}]$ matrices of equation (34), are --

Column 36,
Lines 35-44, replace

"88. A computer program product according to claim 87:
wherein the program code for determining a spatio-temporal relationship among movements at the plurality of locations comprises program code for determining one of a time difference or a phase relationship; and wherein the program code for determining the calibration factor from the determined spatio-temporal relationship comprises program code for determining the calibration factor from the determined one of a time difference or a phase 75."

with

--
88. A computer program product according to claim 87:
wherein the program code for determining a spatio-temporal relationship among movements at the plurality of locations comprises program code for determining one of a time difference or a phase relationship; and
wherein the program code for determining the calibration factor from the determined spatio-temporal relationship comprises program code for determining the calibration factor from the determined one of a time difference or a phase 75. --

Signed and Sealed this

Fourteenth Day of September, 2004

JON W. DUDAS
*Director of the United States Patent and Trademark Office*

UNITED STATES PATENT AND TRADEMARK OFFICE
CERTIFICATE OF CORRECTION

PATENT NO. : 6,678,624 B2
DATED : January 13, 2004
INVENTOR(S) : David F. Normen It is certified that error appears in the above-identified patent and that said Letters Patent is hereby corrected as shown below:

Column 11,
Lines 19-22, replace "integration technique is described in U.S. patent application Ser. No. 09/116,845 to Cunningham et al., filed Jul. 16, 1998 and incorporated herein by reference in its entirety [previously filed case on spatial integration]." with
-- integration technique as described in U.S. Patent No. 6,233,526, incorporated herein by reference in its entirety. --

Column 12,
Lines 28-29, replace $$-\rho_f A_f \left(\frac{\partial}{\partial t}+v_f \frac{\partial}{\partial x}\right)^2 y - Fc - \overline{\tau c}(\theta+\alpha) = 00 \quad (11)"$$
$$-\rho_f I_f \ddot{\theta} + Mc + PA_f y' = 0$$

with $$-\rho_f A_f \left(\frac{\partial}{\partial t}+v_f \frac{\partial}{\partial x}\right)^2 y - Fc - \overline{\tau c}(\theta+\alpha) = 0 \quad (11)--$$
$$-\rho_f I_f \ddot{\theta} + Mc + PA_f y' = 0$$

Lines 35-36, replace "1310, $v_j$ is the velocity of the material 1320 in the conduit 1310, $\rho_j I_j$ is the inertia per unit length of the material 1320" with -- 1310, $v_f$ is the velocity of the material 1320 in the conduit 1310, $\rho_f I_f$ is the inertia per unit length of the material 1320 --
Lines 44-47, replace "shear ( ) on the wall of the conduit "beam":

$$V' - \rho_t A_t - d\ddot{y} + \rho_f A_f \left(\frac{\partial}{\partial t}+v_f \frac{\partial}{\partial x}\right)^2 y + F(x,t) = 0 \quad (12)"$$

with -- shear ( $\tau$ ) on the wall of the conduit "beam":

$$V' - \rho_t A_t - d\ddot{y} + \rho_f A_f \left(\frac{\partial}{\partial t}+v_f \frac{\partial}{\partial x}\right)^2 y + F(x,t) = 0 \quad (12)--$$

Lines 53-56, replace "$y'(x,t) = \theta(x,t) + \alpha(x,t) V(x,t) = \hat{k}GA\alpha(x,t) M(x,t) = EI_t\theta'(x,t)$ (13) This can be reduced to two equations in terms of y(x,t) and x,t." with
-- $y'(x,t) = \theta(x,t) + \alpha(x,t) V(x,t) = \hat{k}GA_t\alpha(x,t) M(x,t) = EI_t\theta'(x,t)$ (13) This can be reduced to two equations in terms of y(x,t) and θx, t. --

UNITED STATES PATENT AND TRADEMARK OFFICE
CERTIFICATE OF CORRECTION

PATENT NO. : 6,678,624 B2
DATED : January 13, 2004
INVENTOR(S) : David F. Normen It is certified that error appears in the above-identified patent and that said Letters Patent is hereby corrected as shown below:

Column 13,
Lines 1-24, replace $$x = L\underline{x} \quad dx = L d\underline{x} \qquad (15)$$

$$t = \frac{1}{\omega_1}\underline{t} \quad dt = \frac{1}{\omega_1} d\underline{t} \quad \underline{\omega}_r = \frac{\omega_r}{\omega_1} \quad \underline{\omega} = \frac{\omega}{\omega_1}$$

$$\eta_r(t) = e^{j\omega t} = \eta_r(\underline{t}) = e^{j\frac{\omega}{\omega_1}\underline{t}} = e^{j\underline{\omega}\underline{t}}\langle in \rangle \quad \underline{\eta}_r(\underline{t}) = \frac{1}{L}\eta_r(\underline{t})\langle 0 \rangle$$

$$\Phi_r(x) = \Phi_r(\underline{x}) = \underline{\Phi}_r(\underline{x})\langle 0 \rangle$$

$$\Phi_r(x) = \begin{bmatrix} e^{\lambda 1, x} & e^{-\lambda 1, x} & e^{j\lambda 2, x} & e^{-j\lambda 2, x} \end{bmatrix}\{BC_r\}\langle 0 \rangle$$

$$\Phi_r(\underline{x}) = \begin{bmatrix} e^{\lambda 1, L\underline{x}} & e^{-\lambda 1, L\underline{x}} & e^{j\lambda 2, L\underline{x}} & e^{-j\lambda 2, L\underline{x}} \end{bmatrix}\{BC_r\}\langle 0 \rangle$$

$$\underline{\Phi}_r(\underline{x}) = \begin{bmatrix} e^{\lambda 1, L\underline{x}} & e^{-\lambda 1, L\underline{x}} & e^{j\lambda 2, L\underline{x}} & e^{-j\lambda 2, L\underline{x}} \end{bmatrix}\{BC_r\}\langle 0 \rangle$$

$$\Psi_r(x) = \Psi_r(\underline{x}) = \frac{1}{L}\underline{\Psi}_r(\underline{x})\langle 1/in \rangle$$

$$\Psi_r(x) = \begin{bmatrix} e^{\lambda 1, x} & e^{-\lambda 1, x} & e^{j\lambda 2, x} & e^{-j\lambda 2, x} \end{bmatrix}[u_r]\{BC_r\}\langle 1/in \rangle$$

$$\Psi_r(\underline{x}) = \begin{bmatrix} e^{\lambda 1, L\underline{x}} & e^{-\lambda 1, L\underline{x}} & e^{j\lambda 2, L\underline{x}} & e^{-j\lambda 2, L\underline{x}} \end{bmatrix}[u_r]\{BC_r\}\langle 1/in \rangle$$

$$\underline{\Psi}_r(\underline{x}) = \begin{bmatrix} e^{\lambda 1, L\underline{x}} & e^{-\lambda 1, L\underline{x}} & e^{j\lambda 2, L\underline{x}} & e^{-j\lambda 2, L\underline{x}} \end{bmatrix}[\underline{u}_r]\{BC_r\}\langle 0 \rangle$$

$$[\underline{u}_r] = L[u_r]$$

with $$x = L\underline{x} \quad dx = L d\underline{x} \qquad (15)$$

$$t = \frac{1}{\omega_1}\underline{t} \quad dt = \frac{1}{\omega_1} d\underline{t} \quad \underline{\omega}_r = \frac{\omega_r}{\omega_1} \quad \underline{\omega} = \frac{\omega}{\omega_1}$$

$$\eta_r(t) = e^{j\omega t} = \eta_r(\underline{t}) = e^{j\frac{\omega}{\omega_1}\underline{t}} = e^{j\underline{\omega}\underline{t}}\langle in \rangle \quad \underline{\eta}_r(\underline{t}) = \frac{1}{L}\eta_r(\underline{t})\langle 0 \rangle$$

$$\Phi_r(x) = \Phi_r(\underline{x}) = \underline{\Phi}_r(\underline{x})\langle 0 \rangle$$

$$\Phi_r(x) = \begin{bmatrix} e^{\lambda 1, x} & e^{-\lambda 1, x} & e^{j\lambda 2, x} & e^{-j\lambda 2, x} \end{bmatrix}\{BC_r\}\langle 0 \rangle$$

$$\Phi_r(\underline{x}) = \begin{bmatrix} e^{\lambda 1, L\underline{x}} & e^{-\lambda 1, L\underline{x}} & e^{j\lambda 2, L\underline{x}} & e^{-j\lambda 2, L\underline{x}} \end{bmatrix}\{BC_r\}\langle 0 \rangle$$

$$\underline{\Phi}_r(\underline{x}) = \begin{bmatrix} e^{\lambda 1, L\underline{x}} & e^{-\lambda 1, L\underline{x}} & e^{j\lambda 2, L\underline{x}} & e^{-j\lambda 2, L\underline{x}} \end{bmatrix}\{BC_r\}\langle 0 \rangle$$

$$\Psi_r(x) = \Psi_r(\underline{x}) = \frac{1}{L}\underline{\Psi}_r(\underline{x})\langle 1/in \rangle$$

$$\Psi_r(x) = \begin{bmatrix} e^{\lambda 1, x} & e^{-\lambda 1, x} & e^{j\lambda 2, x} & e^{-j\lambda 2, x} \end{bmatrix}[u_r]\{BC_r\}\langle 1/in \rangle$$

$$\Psi_r(\underline{x}) = \begin{bmatrix} e^{\lambda 1, L\underline{x}} & e^{-\lambda 1, L\underline{x}} & e^{j\lambda 2, L\underline{x}} & e^{-j\lambda 2, L\underline{x}} \end{bmatrix}[u_r]\{BC_r\}\langle 1/in \rangle$$

$$\underline{\Psi}_r(\underline{x}) = \begin{bmatrix} e^{\lambda 1, L\underline{x}} & e^{-\lambda 1, L\underline{x}} & e^{j\lambda 2, L\underline{x}} & e^{-j\lambda 2, L\underline{x}} \end{bmatrix}[\underline{u}_r]\{BC_r\}\langle 0 \rangle$$

$$[\underline{u}_r] = L[u_r]$$

UNITED STATES PATENT AND TRADEMARK OFFICE
CERTIFICATE OF CORRECTION

PATENT NO. : 6,678,624 B2
DATED : January 13, 2004
INVENTOR(S) : David F. Normen It is certified that error appears in the above-identified patent and that said Letters Patent is hereby corrected as shown below:

Column 14,
Line 60, replace "$-\frac{d\omega_1 L}{EI_t}\Phi_r(x)\frac{\partial \eta_r(t)}{\partial t} - \ldots \frac{2\rho_f A_f v_f \omega_1}{EI_t}\frac{\partial \Phi_r(x)}{\partial x}\frac{\partial \eta_r(t)}{\partial t} - $"

with $-\frac{d\omega_1 L}{EI_t}\underline{\Phi_r(x)}\frac{\partial \underline{\eta_r(t)}}{\partial t} - \frac{2\rho_f A_f v_f \omega_1}{EI_t}\frac{\partial \underline{\Phi_r(x)}}{\partial x}\frac{\partial \underline{\eta_r(t)}}{\partial t} - -$ Column 15,
Line 3, replace "$-\frac{kGA_t}{EI_t}\left(\frac{\partial \Phi_r(x)}{\partial x} - \Psi_r(x)\right)\eta_r(t) - \ldots \frac{\rho I \omega_1^2}{EI_t}\Psi_r(x)\frac{\partial \eta_r(t)}{\partial t^2} = 0$"

with $-\frac{kGA_t}{EI_t}\left(\frac{\partial \underline{\Phi_r(x)}}{\partial x} - \underline{\Psi_r(x)}\right)\underline{\eta_r(t)} - \frac{\rho I \omega_1^2}{EI_t}\underline{\Psi_r(x)}\frac{\partial^2 \underline{\eta_r(t)}}{\partial t^2} = 0 -$ Line 12, replace "$-\frac{d\omega_1 L^4}{EI_t}\frac{1}{L}\Phi_r(x)\frac{\partial \eta_r(t)}{\partial t} - \ldots \frac{2\rho_f A_f v_f \omega_1 L^3}{EI_t}\frac{1}{L}\frac{\partial \Phi_r(x)}{\partial x}\frac{\partial \eta_r(t)}{\partial t} - $"

with $-\frac{d\omega_1 L^4}{EI_t}\frac{1}{L}\underline{\Phi_r(x)}\frac{\partial \underline{\eta_r(t)}}{\partial t} - \frac{2\rho_f A_f v_f \omega_1 L^3}{EI_t}\frac{1}{L}\frac{\partial \underline{\Phi_r(x)}}{\partial x}\frac{\partial \underline{\eta_r(t)}}{\partial t} - -$ Lines 20-23, replace "$-\left(\frac{1}{L}\frac{\partial \Phi_r(x)}{\partial(x)} - \frac{1}{L}\Psi_r(x)\right)\eta_r(t) - \ldots \frac{\rho I \omega_1^2 L^2}{EI_t}\frac{1}{L}\Psi_r(x)\frac{\partial^2 \eta_r(t)}{\partial t^2} = 0$ In equation (19), S is positive for tension, therefore S is" with $-\left(\frac{1}{L}\frac{\partial \underline{\Phi_r(x)}}{\partial(x)} - \frac{1}{L}\underline{\Psi_r(x)}\right)\underline{\eta_r(t)} - \frac{\rho I \omega_1^2 L^2}{EI_t}\frac{1}{L}\underline{\Psi_r(x)}\frac{\partial^2 \underline{\eta_r(t)}}{\partial t^2} = 0$ In equaiton (19), S is positive for tension, therefore $\underline{S}$ is --

Column 16,
Line 9, delete "..." from the beginning of the equation on line 9.
Line 26, replace $-L\int_{x_t}^{x_t}\begin{Bmatrix}\Phi_m(x)\\ \Psi_m(x)\end{Bmatrix}^T\begin{bmatrix}d+2\dot{m}\frac{\partial}{\partial x} & 0\\ 0 & 0\end{bmatrix}\begin{Bmatrix}\frac{1}{L}\Phi_R(x)\\ \frac{1}{L}\Psi_r(x)\end{Bmatrix}dx\frac{\partial \eta_r(t)}{\partial t} + \cdot$  with $-L\int_{x_t}^{x_t}\begin{Bmatrix}\underline{\Phi_m(x)}\\ \underline{\Psi_m(x)}\end{Bmatrix}^T\begin{bmatrix}\underline{d}+2\dot{m}\frac{\partial}{\partial x} & 0\\ 0 & 0\end{bmatrix}\begin{Bmatrix}\frac{1}{L}\underline{\Phi_R(x)}\\ \frac{1}{L}\underline{\Psi_r(x)}\end{Bmatrix}d\underline{x}\frac{\partial \underline{\eta_r(t)}}{\partial t} + -$ Line 32, delete "..." from the beginning of the equation on line 32
Lines 62-63, replace "$[mr]\{\ddot{\eta}(t)\} + [dr+cr]\{\dot{\eta}(t)\} + [kr]\{\eta(t)\} = \{N_r\}$  (28)

The modal response $\{\eta(t)\}$ may be considered to be" with $[\underline{mr}]\{\ddot{\underline{\eta}}(t)\} + [\underline{dr}+\underline{cr}]\{\dot{\underline{\eta}}(t)\} + [\underline{kr}]\{\underline{\eta}(t)\} = \{\underline{N_r}\}$  (28)

The modal response $\{\underline{\eta}(t)\}$ may be considered to be --

Line 67, replace "$-(-\omega^2[mr] + j\omega[dr+cr] + [kr])\{\eta(t)\} = \{N\}$  (29)"
with
$-(-\underline{\omega}^2[\underline{mr}] + j\underline{\omega}[\underline{dr}+\underline{cr}] + [\underline{kr}])\{\underline{\eta}(t)\} = \{\underline{N}\}$  (29) --

UNITED STATES PATENT AND TRADEMARK OFFICE
CERTIFICATE OF CORRECTION

PATENT NO. : 6,678,624 B2
DATED : January 13, 2004
INVENTOR(S) : David F. Normen It is certified that error appears in the above-identified patent and that said Letters Patent is hereby corrected as shown below:

Column 17,
Lines 14-17, replace $-\{\eta(t)\} = (-\omega^2[mr] + j\omega[dr + cr] + [kr])^{-1}\{N\}$  (30)
At this point, a simplifying assumption may be made that the beam acts like a Euler/Bernoulli beam, i.e. $\rho I \approx A \approx S \approx 0$ -- with $-\{\underline{\eta(t)}\} = (-\underline{\omega}^2[\underline{mr}] + j\underline{\omega}[\underline{dr} + \underline{cr}] + [\underline{kr}])^{-1}\{\underline{N}\}$  (30)

At this point, a simplifying assumption may be made that the beam acts like a Euler/Bernoulli beam, i.e. $\underline{\rho I} \approx \underline{A} \approx \underline{S} \approx 0$ --

Line 33, replace $-\{\eta(t)\} = (-\omega^2 \rho A[\hat{m}r] + j\omega(d[\hat{d}r] + \hat{m}[\hat{c}r]) + [\hat{k}r])^{-1}\{N\}$  (32) --
with $-\{\underline{\eta(t)}\} = (-\underline{\omega}^2 \underline{\rho A}[\underline{\hat{m}r}] + j\underline{\omega}(\underline{d}[\underline{\hat{d}r}] + \underline{\hat{m}}[\underline{\hat{c}r}]) + [\underline{\hat{k}r}])^{-1}\{\underline{N}\}$  (32) --

Lines 43-62, replace "damping, Coriolis and stiffness matrices $[\hat{m}r], [\hat{d}r], [\hat{c}r], and [\hat{k}r]$ can be assumed to be constant. Assuming the modal excitation doesn't change, the only variables in equation (32) that change are $\rho A, d, and \hat{m}$. It may also be assumed that ) ω=1, as the firs bending mode is typically driven in a straight-tube Coriolis meter. Theoretically, mass flow can be measured in modal domain because $\{\eta(t)\}$ is complex with flow:

$$\rho A = ((\rho_t A_t + \rho_f A_f)L)\omega_1^2 \frac{L^3}{EI_t}$$  (33)

$$\dot{m} = \frac{\rho_1 A_1 v_1^2}{EI_t}$$

where $$(\rho_t A_t + \rho_f A_f)L\left(\frac{lbf\,\sec^2}{in}\right)$$ -- with -- damping, Coriolis and stiffness matrices $[\underline{\hat{m}r}], [\underline{\hat{d}r}], [\underline{\hat{c}r}], and [\underline{\hat{k}r}]$ can be assumed to be constant. Assuming the modal excitation doesn't change, the only variables in equation (32) that change are $\underline{\rho A, d, and \hat{m}}$. It may also be assumed that ω=1, as the first bending mode is typically driven in a straight-tube Coriolis meter. Theoretically, mass flow can be measured in modal domain because $\{\underline{\eta(t)}\}$ is complex with flow:

$$\underline{\rho A} = ((\rho_t A_t + \rho_f A_f)L)\omega_1^2 \frac{L^3}{EI_t}$$  (33)

$$\underline{\dot{m}} = \frac{\rho_f A_f v_f^2}{EI_t}$$

where $$(\rho_t A_t + \rho_f A_f)L\left(\frac{lbf\,\sec^2}{in}\right)$$

UNITED STATES PATENT AND TRADEMARK OFFICE
CERTIFICATE OF CORRECTION

PATENT NO. : 6,678,624 B2  
DATED : January 13, 2004  
INVENTOR(S) : David F. Normen Page 5 of 6

It is certified that error appears in the above-identified patent and that said Letters Patent is hereby corrected as shown below:

Column 18,  
Line 11, replace $$\{\eta(t)\} = \frac{EI_t}{((\rho A)L)L^3}\left(-\omega^2[\hat{m}r] + 2j\zeta_r^1\omega_{r,\lambda}]\omega[\hat{d}r] + 2j\frac{(\rho_f A_f v_f)}{((\rho A)L)L^3}[\hat{c}r] + \frac{EI_t}{((\rho A)L)L^3}[\hat{k}r]\right)^{-1}\{N\} \quad (34)$$

with $$\{\eta(t)\} = \frac{EI_t}{((\rho A)L)L^3}\left(-\omega^2[\hat{m}r] + 2j\zeta_r^1\omega_{r,\lambda}]\omega[\hat{d}r] + 2j\frac{(\rho_f A_f v_f)}{((\rho A)L)L^3}[\hat{c}r] + \frac{EI_t}{((\rho A)L)L^3}[\hat{k}r]\right)^{-1}\{N\} \quad (34)$$

Line 17, replace "remaining variables in equation (34) are $\overline{EI_t, \rho_f A_f v_f, \omega,}$ and" with -- remaining variables in equation (34) are $\underline{EI_t, \rho_f A_f v_f, \omega}$ and --

Lines 24-25, replace "modal mass, damping, Coriolis and stiffness matrices $\overline{[\hat{m}r], [\hat{d}r], [\hat{c}r], \text{and } [\hat{k}r]}$ can be assumed to be constant. So the" with -- modal mass, damping, Coriolis and stiffness matrices $\underline{[\hat{m}r], [\hat{d}r], [\hat{c}r], \text{and } [\hat{k}r]}$ can be assumbed to be constant. So the --

Line 33, replace $$\{y(x,t)\}_p = \left[\Phi_r(x_p)\right]_{Pr} L\{\eta(t)\}_r \quad (35)$$

with $$\{y(\underline{x},t)\}_p = \left[\Phi_r(\underline{x_p})\right]_{p,r} L\{\underline{\eta}(\underline{t})\}_r \quad (35)$$

Column 19,  
Line 10, replace $$\det\begin{bmatrix}(A-B)\lambda_r^2 - \rho A\omega^2 & B\lambda_r \\ -(S+B)\lambda_r & B - \lambda_r^2 - \rho I\omega^2\end{bmatrix} = 0 \quad (38)$$

with $$\det\begin{bmatrix}(\underline{A}-\underline{B})\lambda_r^2 - \rho A\omega^2 & \underline{B}\lambda_r \\ -(\underline{S}+\underline{B})\lambda_r & \underline{B} - \lambda_r^2 - \rho I\omega^2\end{bmatrix} = 0 \quad (38)$$

Line 38, replace "solve for ρA, S, ρI, and B:" with -- solve for $\underline{\rho A}$, $\underline{S}$, $\underline{\rho I}$, and $\underline{B}$: --

Column 20,  
Line 5, replace $$\begin{bmatrix}\ddot{}\\ mr\\ \ddot{}\end{bmatrix}_{measured} = \rho A[\hat{m}r_\Phi] + \rho I[\hat{m}r_\Psi] \quad (42)$$

with $$\begin{bmatrix}\ddot{}\\ mr\\ \ddot{}\end{bmatrix}_{measured} = \underline{\rho A}[\hat{m}r_\Phi] + \underline{\rho I}[\hat{m}r_\Psi] \quad (42)$$

Line 15, replace $$\begin{Bmatrix}\rho A\\ \rho I\end{Bmatrix} = \begin{bmatrix}\{\hat{m}r_\Phi\}_{,1} & \{\hat{m}r_\Psi\}_{,1}\\ \vdots & \vdots\\ \{\hat{m}r_\Phi\}_{,r} & \{\hat{m}r_\Psi\}_{,r}\end{bmatrix}\begin{bmatrix}\{mr_{measured}\}_{,1}\\ \vdots\\ \{mr_{measured}\}_{,r}\end{bmatrix} \quad (43)$$

with $$\begin{Bmatrix}\underline{\rho A}\\ \underline{\rho I}\end{Bmatrix} = \begin{bmatrix}\{\hat{m}r_\Phi\}_{,1} & \{\hat{m}r_\Psi\}_{,1}\\ \vdots & \vdots\\ \{\hat{m}r_\Phi\}_{,r} & \{\hat{m}r_\Psi\}_{,r}\end{bmatrix}^+\begin{bmatrix}\{mr_{measured}\}_{,1}\\ \vdots\\ \{mr_{measured}\}_{,r}\end{bmatrix} \quad (43)$$

Line 25, replace "ρI can be measured and used to calculate $\underline{EI_t \text{ and } \hat{k}GA.}$" with -- ρI can be measured and used to calculate $\underline{EI_t \text{ and } \hat{k}GA_t.}$ --

UNITED STATES PATENT AND TRADEMARK OFFICE
CERTIFICATE OF CORRECTION

PATENT NO. : 6,678,624 B2
DATED : January 13, 2004
INVENTOR(S) : David F. Normen It is certified that error appears in the above-identified patent and that said Letters Patent is hereby corrected as shown below:

Column 23,
Line 16, replace "e.g., the $[\hat{m}r] \text{ and } [\hat{k}r]$ krimatrices of equation (34), are" with -- e.g., the $[\hat{m}r] \text{ and } [\hat{k}r]$ matrices of equation (34), are --

Column 36,
Lines 35-44, replace

"88. A computer program product according to claim 87:
wherein the program code for determining a spatio-temporal relationship among movements at the plurality of locations comprises program code for determining one of a time difference or a phase relationship; and wherein the program code for determining the calibration factor from the determined spatio-temporal relationship comprises program code for determining the calibration factor from the determined one of a time difference or a phase 75."

with

--
88. A computer program product according to claim 87:
wherein the program code for determining a spatio-temporal relationship among movements at the plurality of locations comprises program code for determining one of a time difference or a phase relationship; and
wherein the program code for determining the calibration factor from the determined spatio-temporal relationship comprises program code for determining the calibration factor from the determined one of a time difference or a phase 75. --

This certificate supersedes Certificate of Correction issued September 14, 2004.

Signed and Sealed this

Twenty-third Day of November, 2004

JON W. DUDAS
*Director of the United States Patent and Trademark Office*